(12) United States Patent
Satou et al.

(10) Patent No.: US 6,311,667 B1
(45) Date of Patent: Nov. 6, 2001

(54) COMBUSTION CONTROL APPARATUS FOR INTERNAL COMBUSTION ENGINE

(75) Inventors: Fumikazu Satou, Toyota; Senji Kato, Nishikamo-gun; Yusuke Kamijyo, Toyota, all of (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 09/587,454

(22) Filed: Jun. 5, 2000

(30) Foreign Application Priority Data

Jun. 14, 1999 (JP) .................................................. 11-166961

(51) Int. Cl.[7] .................................................. F02B 17/00
(52) U.S. Cl. ........................................ 123/295; 123/90.15
(58) Field of Search ................................ 123/295, 90.15, 123/90.16, 90.17, 90.18

(56) References Cited

U.S. PATENT DOCUMENTS

| | | | |
|---|---|---|---|
| 5,927,238 | * | 7/1999 | Watson .............................. 123/90.15 |
| 5,967,114 | * | 10/1999 | Yasuoka .............................. 123/295 |
| 6,006,725 | * | 12/1999 | Stefanopolou et al. .......... 123/90.15 |
| 6,055,948 | * | 5/2000 | Shiraishi et al. .................. 123/90.15 |
| 6,148,791 | * | 11/2000 | Fujieda et al. ....................... 123/295 |
| 6,196,183 | * | 3/2001 | Bauer et al. ......................... 123/295 |
| 6,250,283 | * | 6/2001 | Russell et al. .................... 123/90.15 |

FOREIGN PATENT DOCUMENTS 5248277A  9/1993 (JP) .
9280092A  10/1997 (JP) .

* cited by examiner

*Primary Examiner*—Erick Solis
(74) *Attorney, Agent, or Firm*—Kenyon & Kenyon

(57) ABSTRACT

An engine includes a variable valve timing mechanism to adjust the valve overlap of intake valves and exhaust valves in accordance with the running state of the engine. The engine operates either in stratified charge combustion mode or in homogenous charge combustion mode in accordance with the running state of the engine. When, for example, the VVT cannot operate normally due to lack of hydraulic pressure, an ECU judges that the state of the VVT is not suitable for stratified combustion and forces the engine to operate in the homogenous combustion mode regardless of the running state of the engine. As a result, the combustion state of the engine does not deteriorated and the amount of $NO_x$ in the exhaust gas does not increase.

10 Claims, 20 Drawing Sheets

COMBUSTION CONTROL APPARATUS FOR INTERNAL COMBUSTION ENGINE

BACKGROUND OF THE INVENTION

The present invention relates to a combustion control apparatus for internal combustion engines that includes a variable valve timing mechanism for adjusting the valve overlap of intake valves and exhaust valves and changes the combustion mode between stratified combustion and homogeneous combustion.

Japanese Unexamined Patent Publication No. 5-248277 discloses a combustion control apparatus that has fuel injectors located in combustion chambers of an engine. The apparatus changes the combustion mode of the engine between stratified combustion and homogeneous combustion according to the current running state of the engine. Specifically, when the engine is running with a relatively small load, the apparatus performs stratified combustion by injecting fuel in the vicinity of the spark plug in each combustion chamber at the end of the compression stroke. At this time, the fuel is concentrated about the spark plug. When the engine load is relatively high, the apparatus performs homogeneous charge combustion by homogeneously injecting fuel into each entire combustion chamber during the intake stroke.

The apparatus of the publication No. 5-248277 also includes a variable valve timing mechanism to adjust the valve overlap in accordance with the state of air-fuel mixture during the stratified and homogenous combustion modes. Particularly, during stratified combustion, the valve overlap is adjusted to create inner exhaust gas recirculation (EGR), which improves combustion and reduces $NO_x$ in the emission.

As described above, the apparatus of the publication optimizes the combustion state of the engine by adjusting the valve overlap in accordance with the current combustion mode referring to the current running state of the engine. However, this apparatus sometimes fails to control the valve overlap in accordance with the engine running state.

For example, the apparatus cannot control the valve overlap when the variable valve timing mechanism is not operating normally, that is, when the mechanism is malfunctioning or when the power supplied to the mechanism is insufficient. Also, the apparatus cannot control the valve overlap when the variable valve timing mechanism is not operating in accordance with the running state of the engine, that is, when a procedure for determining a referential position of the mechanism has not been executed.

In these cases, stratified combustion hinders the internal EGR control, which deteriorates the combustion of the engine. A reduced amount of EGR increases the amount of $NO_x$ in the emissions.

SUMMARY OF THE INVENTION

Accordingly, it is an objective of the present invention to provide a combustion control apparatus for an internal combustion engine that improves the combustion state of the engine and reduces the $NO_x$ in the emission even if the valve overlap is not being controlled in accordance with the running state of the engine.

To achieve the foregoing and other objectives and in accordance with the purpose of the present invention, an apparatus for controlling an engine is provided. The engine has a variable valve timing mechanism to adjust the valve overlap of an intake valve and an exhaust valve in accordance with the running state of the engine. The engine operates in a combustion mode selected from a plurality of combustion modes in accordance with the running state of the engine. The combustion modes include a stratified charge combustion mode, in which a mixture of air and fuel is non-uniformly injected into a combustion chamber, and a homogeneous charge combustion mode, in which the mixture is distributed in a homogeneous manner in the combustion chamber. The apparatus includes a controller and means for determining whether the state of the variable valve timing mechanism is suitable for stratified charge combustion. When the state of the variable valve timing mechanism is judged to be not suitable for stratified charge combustion, the controller forces the engine to perform homogeneous charge combustion regardless of the running state of the engine.

The present invention may also be embodied in a method for controlling an engine. The method includes adjusting the valve overlap of an intake valve and an exhaust valve with a variable valve timing mechanism in accordance with the running state of the engine, and selecting a combustion mode from various combustion modes in accordance with the running state of the engine. The combustion modes include a stratified charge combustion mode, in which a mixture of air and fuel is non-uniformly injected into a combustion chamber, and a homogeneous charge combustion mode, in which the mixture is distributed in a homogeneous manner in the combustion chamber. The method further includes determining whether the state of the variable valve timing mechanism is suitable for stratified charge combustion. When the state of the variable valve timing mechanism is judged to be not suitable for stratified charge combustion, homogeneous charge combustion mode is selected regardless of the running state of the engine.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which:

FIG. 23(*b*) is a graph showing the relationship between the oil temperature THO and a temperature correction detection time kTHO;

FIG. 24(*b*) is a graph showing the relationship between the oil temperature and oil pressure according to the second embodiment;

FIG. 25(*b*) is a graph showing the relationship between the engine speed NE and an engine speed correction detection time kNE.

DETAILED DESCRIPTION OF THE PREFERRED EMBODIMENTS

Figure 1:
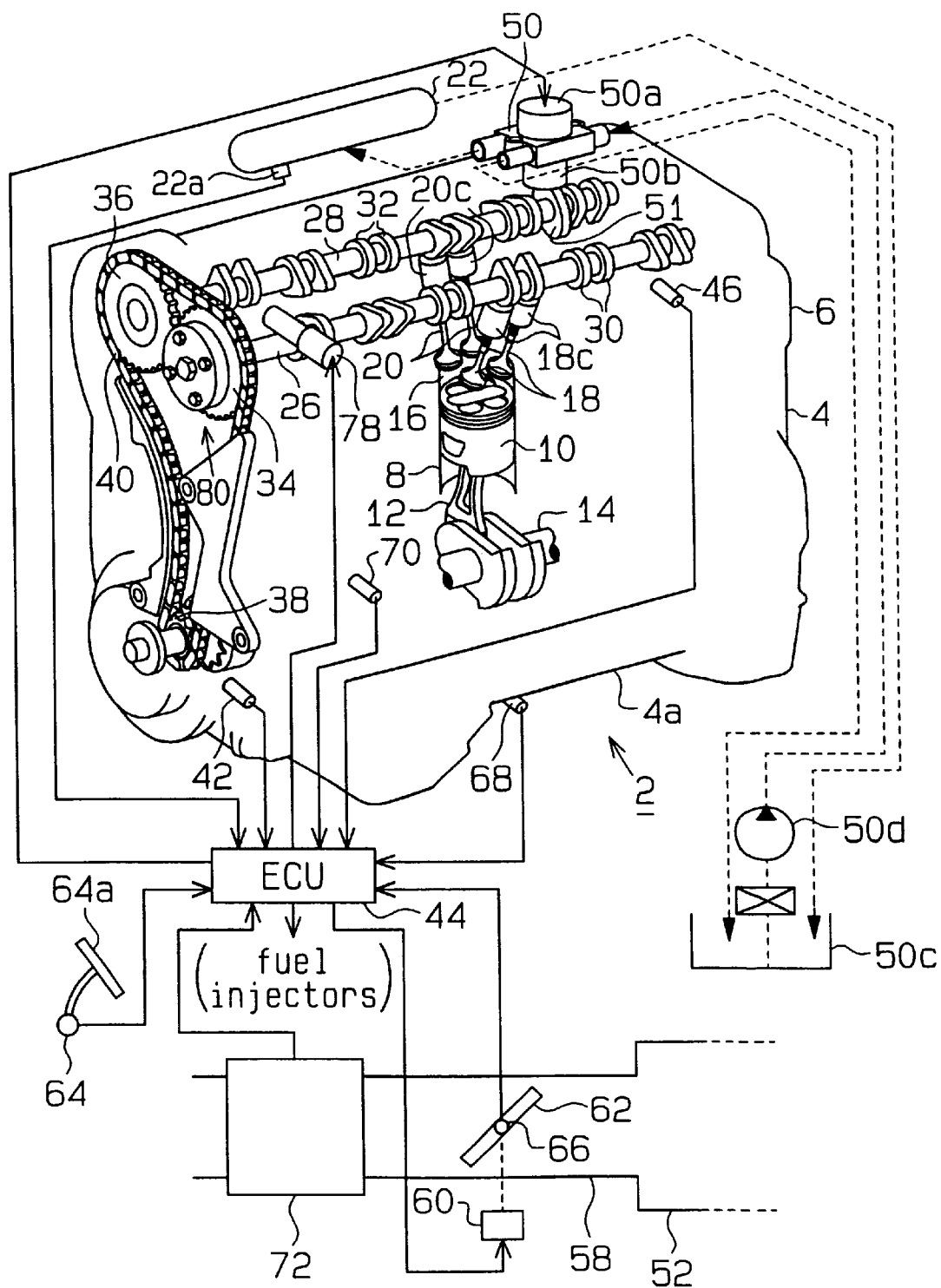
FIG. 1 is a partial perspective view illustrating a cylinder injection type engine according to a first embodiment of the present invention.

As shown in FIG. 1, an in-line six cylinder type engine (hereinafter referred to as the engine) 2 includes a cylinder block 4 and a cylinder head 6 secured to the top of the cylinder block 4. Six in-line cylinders 8 are defined in the cylinder block 4 (only one is shown). A piston 10 is reciprocally housed in each cylinder 8. Each piston 10 is coupled to a crankshaft 14 by a connecting rod 12.

Figure 2:
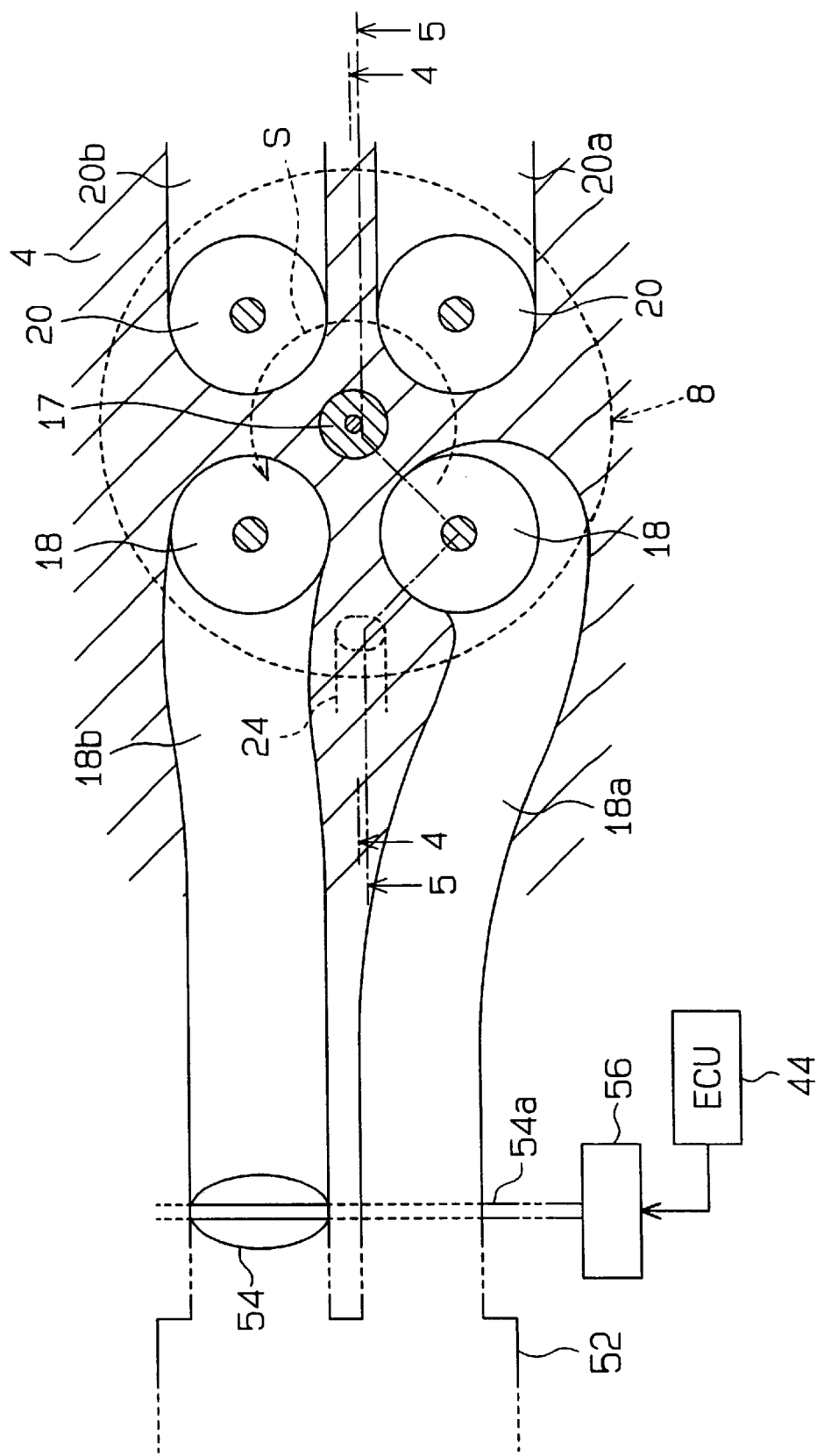
FIG. 2 is a diagrammatic view illustrating the cylinder head and the intake system of the engine shown in FIG. 1.

The inner wall of each cylinder 8, the associated piston 10 and the cylinder head 6 define a combustion chamber 16. As shown in FIG. 2, spark plugs 17 are located in the cylinder head 6. Each plug 17 corresponds to one of the cylinders 8. Each plug 17 is connected to the ignition coil (not shown) of an ignitor 76. Each ignitor 76 corresponds to one of the cylinders 8. Each ignition coil directly supplies secondary current to the corresponding plug 17 in accordance with the ignition timing.

A pair of intake ports 18*a*, 18*b* and a pair of exhaust ports 20*a*, 20*b* are connected to each cylinder 8. The engine 2 has four valves per cylinder. That is, the cylinder head 6 has a pair of intake valves 18 and a pair of exhaust valves 20 corresponding to each cylinder 8. The valves 18, 20 open and close the intake ports 18a and the exhaust ports 20*a*, 20*b*.

A fuel reservoir 22 is located on the cylinder head 6. The reservoir 22 is connected to six fuel injectors 24, each of which corresponds to one of the cylinders 8 (see FIG. 2). The fuel injectors 24 are installed in the cylinder head 6. Each injector 24 directly injects fuel into the corresponding combustion chamber 16. The amount of the injected fuel and the injection timing correspond to the running state of the engine 2.

The cylinder head 6 has an intake camshaft 26 and an exhaust camshaft 28. The camshafts 26, 28 are parallel. Pairs (six pairs in this embodiment) of intake valve cams 30 are located on the intake camshaft 26 with a predetermined interval between adjacent pairs. Each valve cam 30 contacts the intake valve lifter 18*c* of an intake valve 18. Likewise, pairs (six pairs in this embodiment) of exhaust valve cams 32 are located on the exhaust camshaft 28 with a predetermined interval between adjacent pairs. Each exhaust valve cam 32 contacts the valve lifter 20*c* of an exhaust valve 20. Rotation of the intake camshaft 26 and exhaust camshaft 28 causes the intake valves 18 and the exhaust valves 20 to open and close the intake ports 18*a*, 18*b* and exhaust ports 20*a*, 20*b*.

A cam sprocket 34 is coupled to an end of the intake camshaft 26 to rotate integrally with the camshaft 26. Also, a cam sprocket 36 is coupled to an end of the exhaust camshaft 28 to rotate integrally with the camshaft 28. The cam sprockets 34, 36 are coupled to a crank sprocket 38 by a timing chain 40. Rotation of the crankshaft 14 is transmitted to the camshafts 26, 28 by the crank sprocket 38, the timing chain 40 and the cam sprocket 34, 36. During one cycle of the engine 2, or four strokes (intake, compression, combustion and exhaust strokes) of each piston 10, the crankshaft 14 rotates two times (720° CA). Two turns of the crankshaft 14 rotate the camshafts 26, 28 once.

A crank angle sensor 42 is located in the vicinity of the crankshaft 14 to generate a pulse signal indicative of the crank angle. The crank angle sensor 42 is connected to an electronic control unit (ECU) 44, which controls the engine 2. The sensor 42 sends crank angle signals to the ECU 44. A cylinder distinguishing sensor (cam angle sensor) 46 is located in the vicinity of the intake camshaft 26. The distinguishing sensor 46 detects a reference position of the crankshaft 14 based on the rotational phase of the intake camshaft 26 and sends a reference position signal to the ECU 44. The ECU 44 counts the number of the crank angle signals from the crank angle sensor 42 after receiving the reference position signal from the distinguishing sensor 46. The ECU 44 computes the rotation angle, or the crank angle θ, of the crankshaft 14, accordingly.

As shown in FIG. 1, a high pressure fuel pump 50 is located on the cylinder head 6. The pump 50 includes an electromagnetic spill valve 50*a*, a plunger (not shown), a tappet 50*b* coupled to the plunger and a spring (not shown). The spring urges the tappet 50*b* against a pump cam 51 located on the exhaust camshaft 28 of the engine 2. The high pressure pump 50 is connected to a fuel tank 50*c* by a low pressure feeding pump 50*d*, which sends fuel to the high pressure pump 50. The pump cam 51 rotates as the exhaust camshaft 28 rotates, which actuates the high pressure pump 50. Accordingly, the high pressure pump 50 pressurizes fuel from the low pressure pump 50*d* and sends the fuel to the fuel reservoir 22. At this time, the ECU 44 controls the spill valve 50a based on signals from the fuel pressure sensor 22a of the reservoir 22 to send a needed amount of fuel to the reservoir 22. Accordingly, the high pressure pump 50 continues to supply pressurized fuel to the reservoir 22 to maintain the fuel pressure in the reservoir 22 to a predetermined level. The ECU 44 controls combustion in the combustion chambers 16. Specifically, the ECU 44 opens the fuel injector 24 at an appropriate timing and duration based on the running states of the engine 2 to supply pressurized fuel from the reservoir 22 to each combustion chamber 16.

Figure 3:
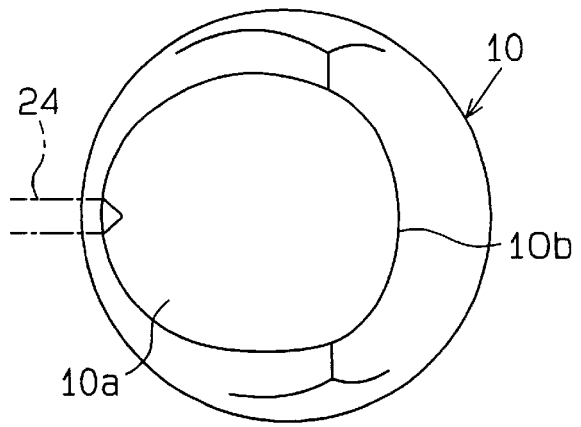
FIG. 3 is a top plan view illustrating the piston head in the engine of FIG. 1.
Figure 4:
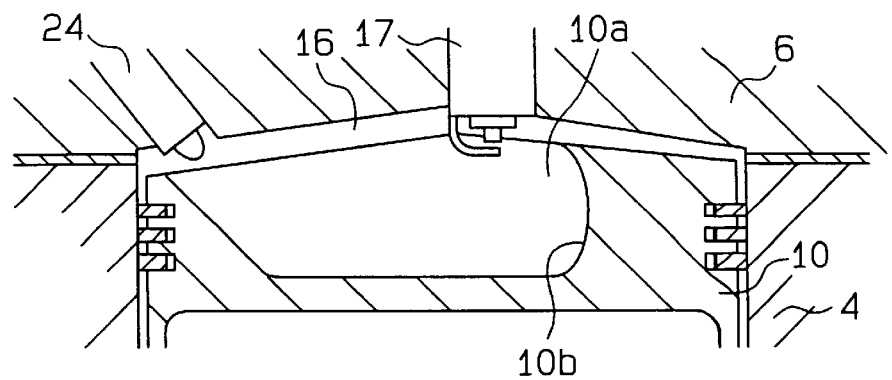
FIG. 4 is a cross-sectional view taken along line 4—4 of FIG. 2.
Figure 5:
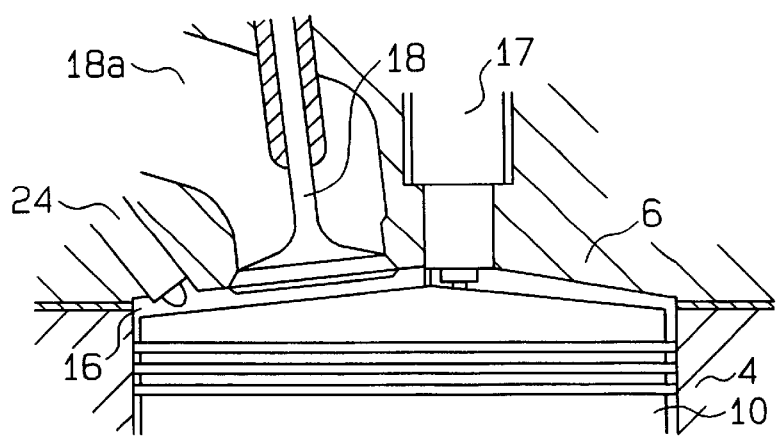
FIG. 5 is a cross-sectional view taken along line 5—5 of FIG. 2.

As shown in FIGS. 3, 4 and 5, each injector 24 is located in the ceiling of the corresponding combustion chamber 16 to face the corresponding piston 10. A bowl 10a is formed in the top portion of each piston 10. The bowl 10a extends from directly below the fuel injector 24 to directly below the spark plug 17.

As shown in FIG. 2, each first intake port 18a is substantially helical and each second intake port 18b is substantially straight. Each pair of the intake ports 18a, 18b connects the corresponding combustion chamber 16 to a surge tank 52. A swirl control valve 54 is located in each second intake port 18b near the surge tank 52. The swirl control valves 54 are connected to a swirl control motor 56 (a DC motor or a step motor) by a common shaft 54a. The motor 56 is controlled by the ECU 44.

The surge tank 52 draws outside air via an air cleaner (not shown) through an intake pipe 58 (see FIG. 1). A throttle valve 62 is located in the intake pipe 58. The throttle valve 62 is actuated by a throttle motor 60 (a DC motor or a step motor). The opening size of the throttle valve 62 is detected by a throttle sensor 66. The throttle valve 62 is controlled such that its opening size corresponds to a signal from an acceleration pedal sensor 64.

Figure 6:
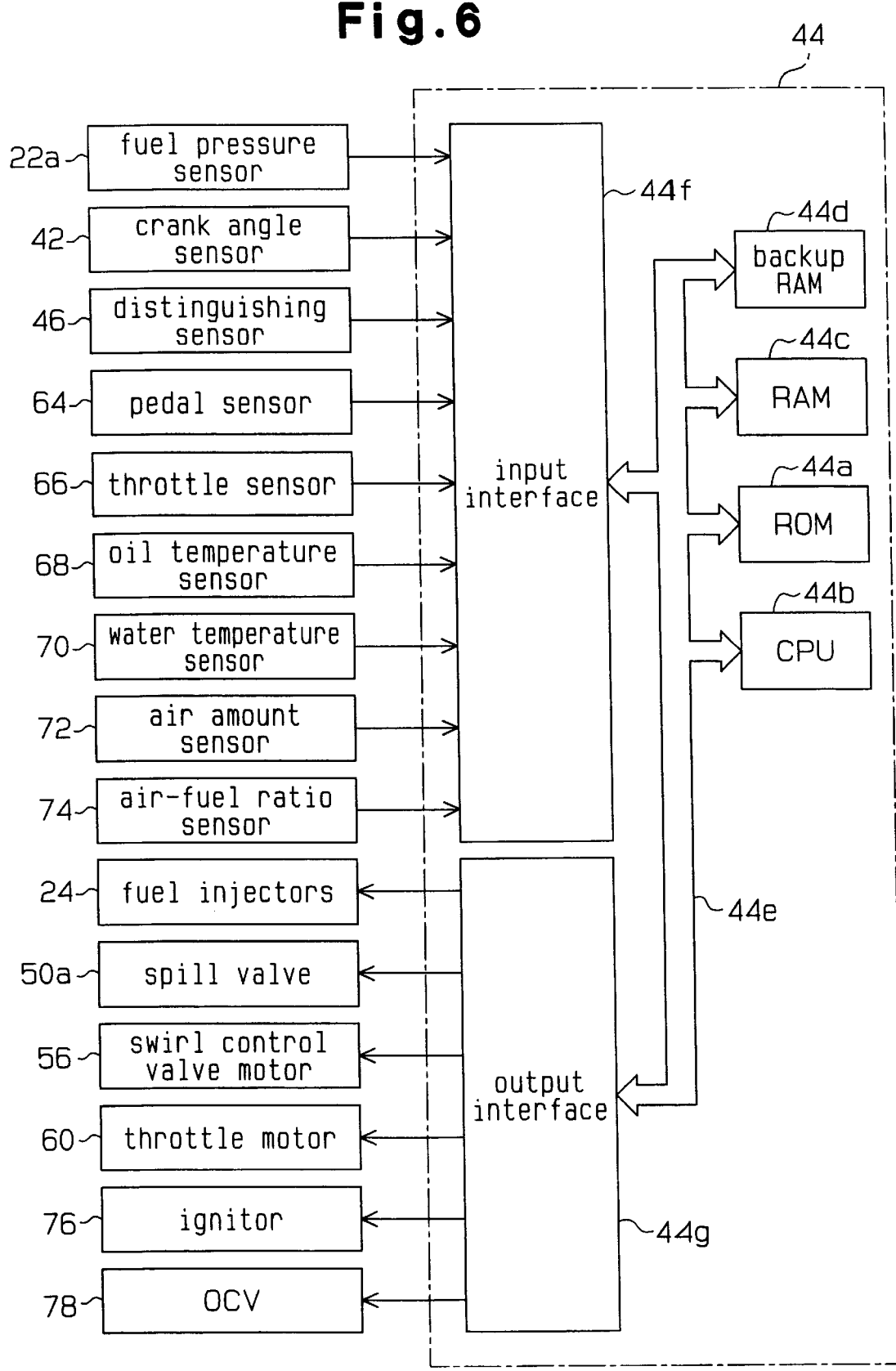
FIG. 6 is a block diagram, showing an electrical construction of the engine shown in FIG. 1.

As shown in FIG. 6, the control system of the engine 2 is mainly constituted by the ECU 44. The ECU 44 has a ROM 44a, which stores various control programs such as a fuel injection control program, a valve timing control program, an air-fuel ratio control program, an ignition timing control program and a malfunction detection program. The ROM 44a also stores maps for determining target values corresponding to various conditions. The ECU 44 also has a CPU 44b, a RAM 44c and a backup RAM 44d. The CPU 44b performs computations based on the control programs stored in the ROM 44a. The RAM 44c temporarily stores the results of the computations of the CPU 44b and data from sensors. The backup RAM 44d stores data in the RAM 44c when the electricity supply is stopped.

The CPU 44b, the ROM 44a, the RAM 44c and the backup RAM 44d are connected to one another and to an input interface 44f and an output interface 44g by a bidirectional bus 44e.

The input interface 44f is connected to the fuel pressure sensor 22a, the crank angle sensor 42, the cylinder distinguishing sensor 46, the acceleration pedal sensor 64 and the throttle sensor 66. Also, an oil temperature sensor 68, a water temperature sensor 70, an intake air amount sensor 72 and an air-fuel ratio sensor 74 are connected to the input interface 44f.

The oil temperature sensor 68 is located in an oil pan 4a to detect the temperature THO of engine oil. The water temperature sensor 70 is located in the cylinder block 4 to detect the temperature of engine coolant water. The intake air amount sensor 72 detects the amount GA of intake air flowing into the intake pipe 58 from the air cleaner. The air-fuel ratio sensor 74 is located in an exhaust pipe (not shown) to detect the air-fuel ratio of the air-fuel mixture based on the components in the exhaust gas. If the received data is in analog form, the input interface 44f converts the signals into digital signals with an A/D converter (not shown) before sending the signals to the bus 44e.

The output interface 44g is connected to the fuel injectors 24, the electromagnetic spill valve 50a, the swirl control motor 56 and the throttle motor 60. Also, the ignitor 76 and an oil control valve (OCV) 78 are connected to the output interface 44g.

The ignitor 76 uses the ignition coil to apply high voltage to the plugs 17, which causes each plug 17 to ignite air-fuel mixture in the associated combustion chamber 16. The ECU 44 commands the OCV 78 to control a variable valve timing mechanism (VVT) 80 attached to the cam sprocket 34 for adjusting the rotation phase difference between the intake camshaft 26 and the exhaust camshaft 28. These external circuits are controlled based on computation results of control programs executed by the CPU 44b.

As described above, the crankshaft 14, the intake camshaft 26 and the exhaust camshaft 28 are coupled to one another by the sprockets 38, 34, 36 and the timing chain 40. The VVT 80 is attached to the cam sprocket 45 of the intake camshaft 26. The structure of the VVT 80 is illustrated in FIG. 7.

Figure 7:
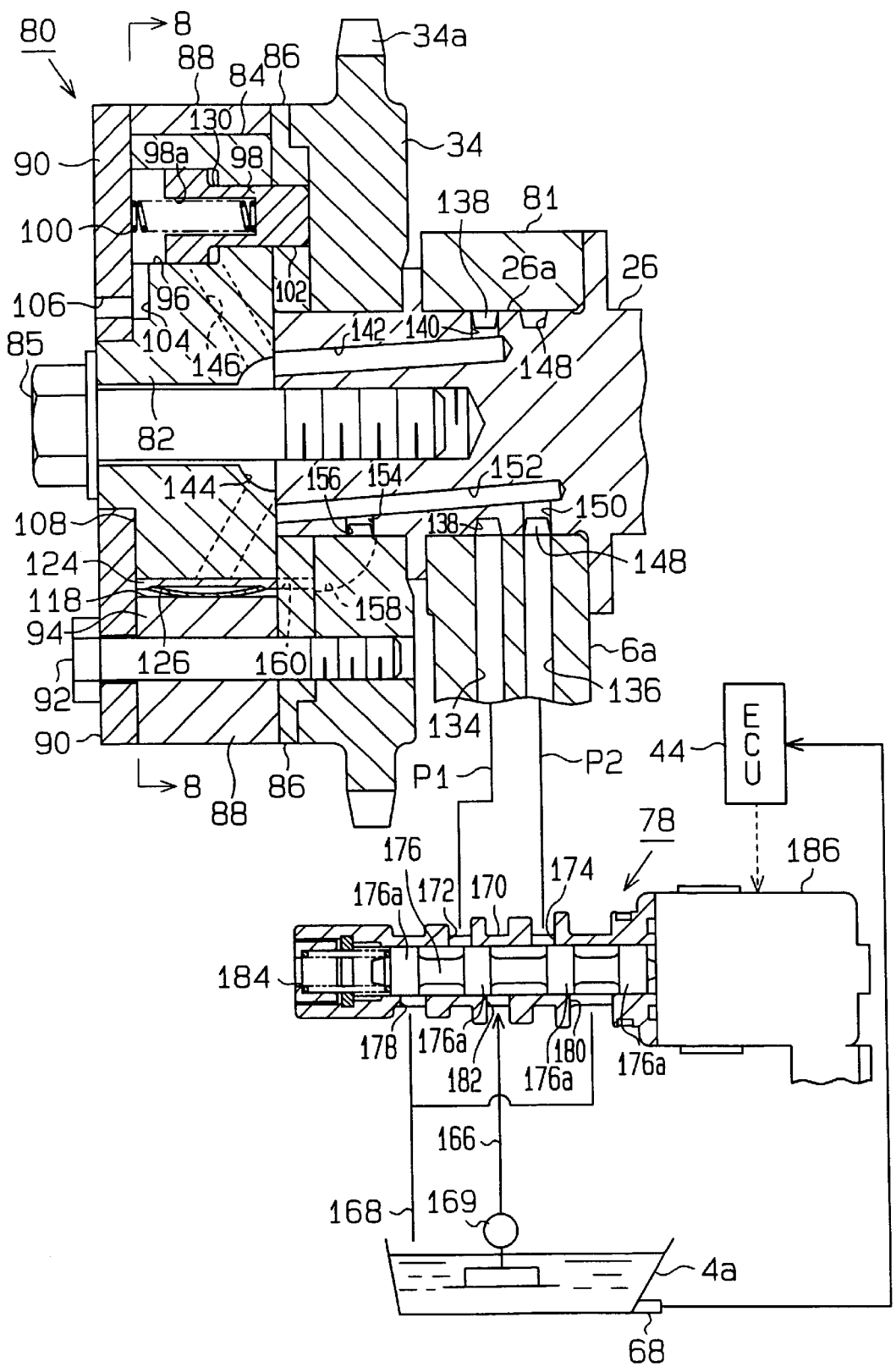
FIG. 7 is a diagrammatic cross-sectional view illustrating a variable valve timing mechanism and an oil control valve in the engine shown in FIG. 1.
Figure 8:
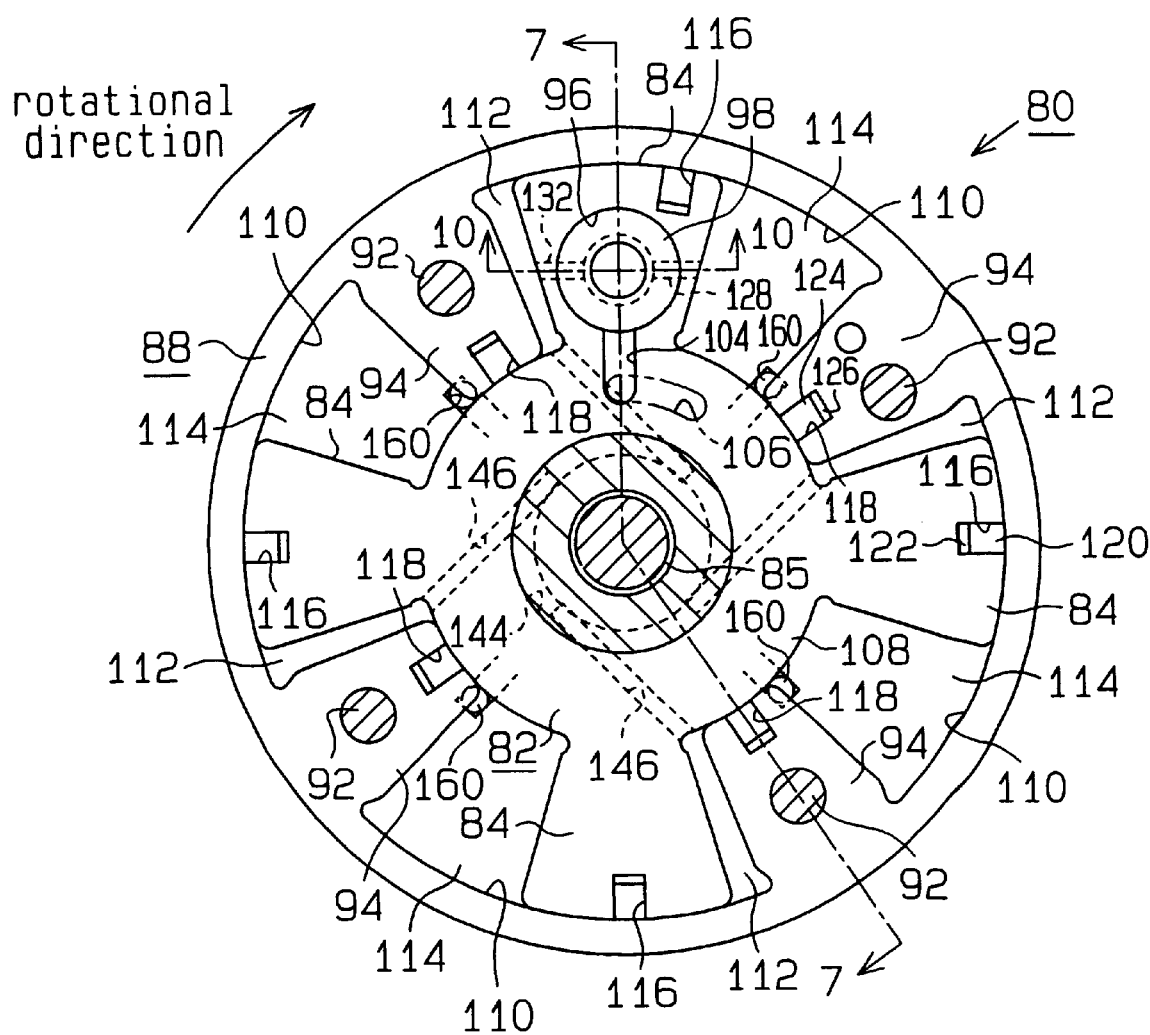
FIG. 8 is a cross-sectional view taken along line 8—8 of FIG. 7.

FIG. 7 is a cross-sectional view showing the VVT 80 and OCV 78. FIG. 8 is a cross-sectional view taken along line 8—8 of FIG. 7 to illustrate the internal structure of the VVT 80. A van rotor 82 and the relevant portions are illustrated in FIG. 7, which is a cross-sectional view taken along line 7—7 of FIG. 8.

As shown in FIG. 7, the intake camshaft 26 includes a journal 26a, which is supported by a journal bearing 6a and a bearing cap 81. The van rotor 82 is fixed to the distal end of the intake camshaft 26 by a bolt 85 and has peripheral vanes 84. The vane rotor 82 is prevented from rotating relative to the intake camshaft 26 by a knock-pin (not shown). The vane rotor 82 therefore rotates integrally with the intake camshaft 26.

The cam sprocket 34 covers the distal end of the intake camshaft 26 and rotates relative to the intake camshaft 26. Outer teeth 34a are formed on the periphery of the cam sprocket 34 (see FIG. 7). A disk 86, a housing body 88 and a cover 90 are secured to the cam sprocket 34 by four bolts 92 (see FIG. 8) to integrally rotate with the cam sprocket 34. The cover 90 covers the housing body 88 and the end of the vane rotor 82. The housing body 88 accommodates the vane rotor 82 and has four projections 94 formed on the inner wall.

One of the vanes 84 has a through hole 96 extending along the axis of the intake camshaft 26. A lock pin 98 is fitted in the through hole 96 to move axially. A spring hole 98a is formed in the lock pin 98. A spring 100 is accommodated in the spring hole 98a to urge the lock pin 98 toward the disk 86. When the lock pin 98 faces a lock recess 102 formed on the disk 86, the spring 100 causes the lock pin 98 to engage, or enter, the recess 102. Accordingly, the rotational position of the vane rotor 82 relative to the disk 86 is fixed. The vane rotor 82 is thus prevented from rotating relative to the housing body 88, and the sprocket 34 rotates integrally with the intake camshaft 26.

An oil groove 104 is formed on the front face of the vane rotor 82. An elongated opening 106 is formed in the cover 90. The groove 104 communicates the opening 106 with the through hole 96. The groove 104 and the opening 106 permit air and oil located at the distal end of the lock pin 98 to flow to the exterior. The vane rotor 82 includes a cylindrical boss 108 located in the center. The four vanes 84 are arranged at equal angular intervals, for example, at ninety degrees, about the axis of the boss 108.

The projections 94 are arranged in the housing body 88 to correspond to the vanes 84. The projections 94 are spaced apart by substantially equal intervals and define a recess 110 between each adjacent pair of the projections 94. Each vane 84 is located in the corresponding recess 110. The outer surface of each vane 84 contacts the surface of the corresponding recess 110. Accordingly, first and second hydraulic chambers 112 and 114 are defined adjacent to each vane 84. Each vane 84 moves between the adjacent projections 94.

Each first hydraulic chamber 112 is located on the trailing side of the corresponding vane 84 with respect to the rotating direction (represented by an arrow in FIG. 8) of the cam sprocket 34, while the second hydraulic chamber 114 is located on the leading side. The rotating direction of the cam sprocket 34 will hereafter be referred to as phase advancing direction and the opposite direction will be referred to as phase retarding direction. Oil is supplied to the first hydraulic chambers 112 when advancing the valve timing of the intake valves 18. Oil is supplied to the second hydraulic chambers 114 when retarding the valve timing of the valves 18.

Grooves 116 and 118 are formed in the distal ends of the vanes 84 and the projections 94, respectively. A seal plate 120 and a leaf spring 122 are accommodated in each groove 116. Each spring 122 urges the corresponding seal plate 120. Likewise, a seal plate 124 and a leaf spring 126 are accommodated in each groove 118. Each spring 126 urges the corresponding seal plate 124.

Figure 9:
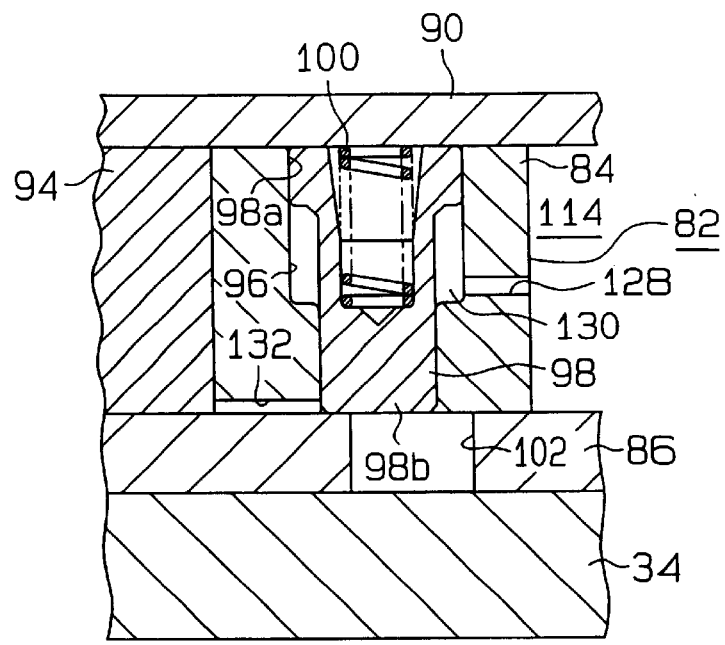
FIG. 9 is an enlarged cross-sectional view illustrating a lock pin of the mechanism of FIG. 7.
Figure 10:
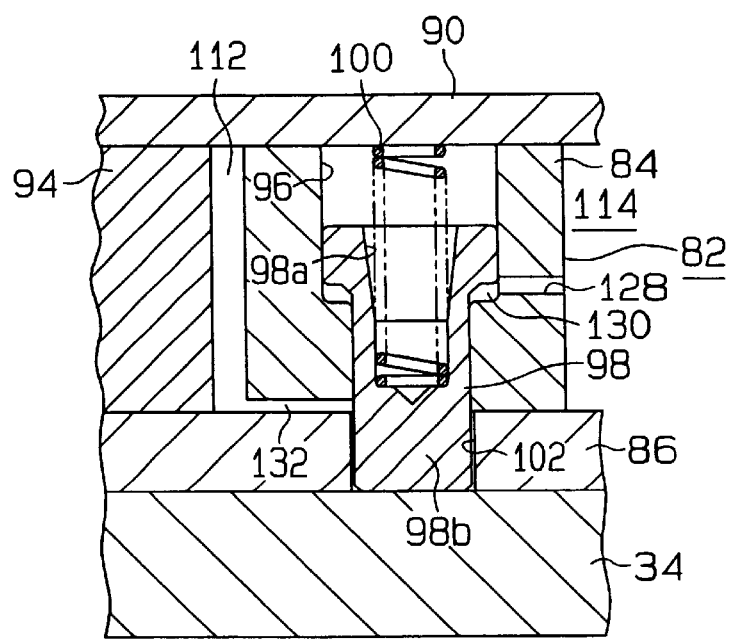
FIG. 10 is an enlarged cross-sectional view like FIG. 8 showing the lock pin engaged with a recess.

The lock pin 98 functions as illustrated in FIGS. 9 and 10. FIG. 10 is a cross-sectional view taken along line 10—10 of FIG. 8. In FIG. 9, the vane rotor 82 is at the most retarded position. Each vane 84 contacts the corresponding projection 94 and cannot move further. In this state, the lock pin 98 does not face the recess 102 and the distal end of the lock pin 98 is not engaged with the recess 102.

When the engine 2 is being cranked or before the ECU 44 starts activating the hydraulic system, the pressure of the first 112 is zero or relatively low. In this state, cranking the engine 2 generates a reverse torque in the intake camshaft 26, which advances the rotational phase of the vane rotor 82 relative to the housing body 88. Accordingly, the lock pin 98 is moved to the position of FIG. 10 and enters the recess 102. This prohibits further relative rotation between the vane rotor 82 and the housing 88 and causes the rotor 82 to rotate integrally with the housing body 88.

The lock pin 98 is disengaged from the recess 102 by supplying oil from the second hydraulic chamber 114 to an annular chamber 130 through an oil passage 128 (see FIGS. 9 and 10). That is, as the engine speed increases, the oil pressure in the annular chamber 130 increases, which disengages the lock pin 98 from the recess 102 against the force of the spring 100. Also, oil is supplied from the first hydraulic chamber 112 to the recess 102 through an oil passage 132, the pressure of which maintains the lock pin 98 at the disengaged position. Disengagement of the lock pin 98 permits the vane rotor 82 to rotate relative to the housing body 88. The rotational position of the vane rotor 82 relative to the housing body 88 is determined in accordance with pressure of the first and second hydraulic chambers 112, 114.

A system for supplying oil to and draining oil from the first and second hydraulic chambers 112, 114 will now be described with reference to FIG. 7.

The journal bearing 6a formed in the cylinder head 6 has first and second passages 134, 136. A circumferential groove 138 is formed on the intake camshaft 26. A hole 140 is formed in the journal 26a. The first passage 134 is connected to a conduit 142 formed in the intake camshaft 26 through the groove 138 and the hole 140. The conduit 142 communicates with an annular space 144. Four radial conduits 146 are formed in the boss 108 to connect the annular space 144 with the first hydraulic chambers 112 to supply oil from the space 144 to the first hydraulic chambers 112.

The second passage 136 is connected to a circumferential groove 148 formed on the intake camshaft 26. A hole 150, a conduit 152, a hole 154 and a groove 156 are formed in the intake camshaft 26 to communicate the groove 148 with an annular groove 158 formed in the cam sprocket 34. As shown in FIGS. 7 and 8, the disk 86 has four oil openings 160 in the vicinity of the projections 94. The openings 160 communicate the groove 158 with the second hydraulic chambers 114 to supply oil from the groove 158 to the second hydraulic chambers 114.

The first passage 134, the groove 138, the hole 140, the conduit 142, the annular space 144 and the oil conduits 146 form an oil path P1 to supply oil to the first hydraulic chambers 112. The second passage 136, the groove 148, the hole 150, the conduit 152, the hole 154, the groove 156, the groove 158 and the openings 160 form an oil path P2 to supply oil to the second hydraulic chambers 114. The ECU 44 controls the OCV 78 to adjust the oil pressure supplied to the first and second hydraulic chambers 112, 114 through the paths P1 and P2.

The paths P1, P2 are connected to the OCV 78 illustrated in FIG. 7. The OCV 78 is connected to supply and drain passages 166, 168. The supply passage 166 is connected to the oil pan 4a. An oil pump 169, which is actuated by rotation of the crankshaft 14, is located between the supply passage 166 and the oil pan 4a. The drain passage 168 is directly connected to the oil pan 4a. The oil pump 169 supplies oil from the oil pan 4a to the supply passage 166.

The OCV 78 has a casing 170, first and second oil ports 172, 174, a spool 176, first and second drain ports 178, 180, a supply port 182, a coil spring 184 and an electromagnetic solenoid 186. The spool 176 has four valve bodies 176a. The first oil port 172 is connected to the path P1 and the second oil port 174 is connected to the path P2. The supply port 182 is connected to the supply passage 166. The first and second drain ports 178, 180 are connected to the drain passage 168.

When the solenoid 186 is de-excited, the force of the spring 184 displaces the spool 176 to the rightmost position in the casing 170 as illustrated in FIG. 7. Accordingly, the valve bodies 176a connect the first oil port 172 with the first drain port 178 and the second oil port 174 with the supply port 182.

In this state, oil in the oil pan 4a is supplied to the second hydraulic chambers 114 via the supply passage 166, the OCV 78, the path P2. Also, oil in the first hydraulic chambers 112 is drained to the oil pan 4a via the path P1, the OCV 78 and the drain passage 168. As a result, the rotational phase of the vane rotor 82 is retarded relative to the housing body 88. This retards the valve timing of the intake valves 18, which are actuated by the intake camshaft 26. Accordingly, the valve overlap is decreased. When the valve timing is most retarded, there is no valve overlap.

Figure 11:
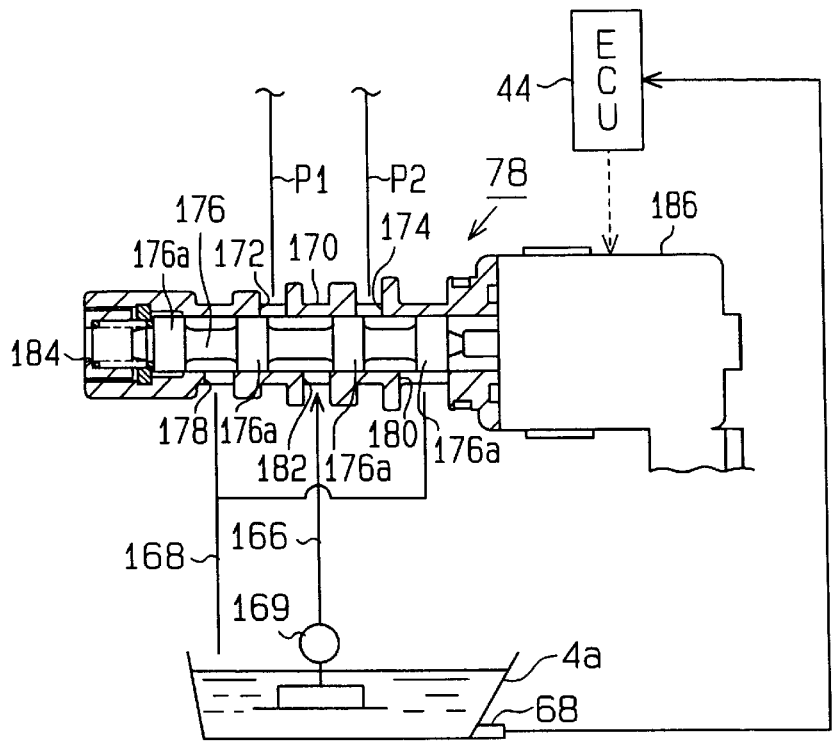
FIGS. 11 and 12 are diagrammatic cross-sectional views illustrating operational states of the oil control valve of FIG. 7.

When the solenoid 186 is excited, the spool 176 is moved to the leftmost position in the casing 170 against the force of the coil spring 184 as shown in FIG. 11. Accordingly, the second oil port 174 is connected to the second drain port 180 and the first oil port 172 is connected to the supply port 182. In this state, oil in the oil pan 4a is supplied to the first hydraulic chambers 112 through the supply passage 166, the OCV 78 and the path P1. Oil in the second hydraulic chambers 114 is returned to the oil pan 4a through the path P2, the OCV 78 and the drain passage. 168. As a result, the rotational phase of the vane rotor 82 is advanced relative to that of the housing body 88. Accordingly, the valve timing of the intake valves 18 are advanced, which increases the valve overlap.

When the spool 176 is moved to the axially middle position in the casing 170 by controlling current to the solenoid 186, the valve bodies 176a close the first and second oil ports 172, 174. Accordingly, oil is not conducted through the oil ports 172, 174. In this state, oil is not supplied to or drained from the first and second hydraulic chambers 112, 114. Oil remaining in the chambers 112, 114 fixes the rotational phase of the vane rotor 82 relative to the housing body 88, which maintains the valve timing of the intake valves 18.

In this manner, the OCV 78 is controlled by signals from the ECU 44 and adjusts the valve timing of the intake valves 18 such that the valve overlap is optimized for the engine 2.

Figure 14:
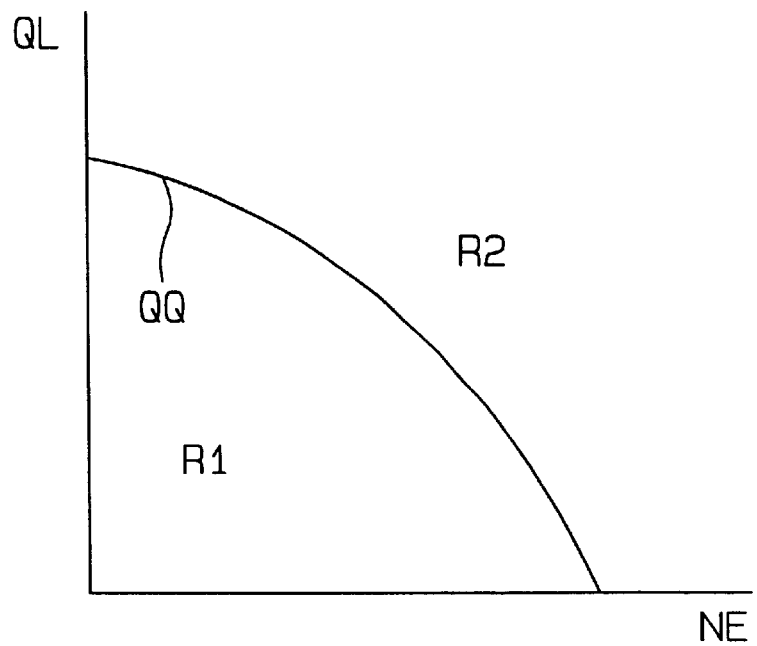
FIG. 14 is a map of running characteristics of the engine shown in FIG. 1.

The ECU 44 defines two engine running areas R1, R2, which are shown in FIG. 14, based on the engine speed NE and a lean combustion injection amount QL, which will be described below. A value QQ in FIG. 14 is a threshold value of the lean combustion injection amount QL and represents the boundary of the running areas R1 and R2 of the engine 2. The threshold value QQ decreases as the engine speed NE increases. The ECU 44 determines which of the areas R1 and R2 the current state of the engine 2 is in based on the engine speed NE and the lean combustion injection amount QL referring to the map of FIG. 14. Specifically, when the lean injection amount QL is less than the threshold value QQ, the ECU 44 judges that the engine 2 is running in the area R1. When the lean injection amount QL is more than the threshold value QQ, the ECU 44 judges that the engine 2 is running in the area R2.

In the area R1, the engine load and the engine speed NE are low. When the engine 2 is running in the area R1, the air-fuel ratio is leaner than a stoichiometric ratio. In the area R2, the engine load and speed are great. When the engine 2 is running in the area R2, the air-fuel ratio is equal to or richer than the stoichiometric ratio. The air-fuel ratio of the area R1 is referred to as a lean air-fuel ratio and the air-fuel ratio of the area R2 is referred to as a rich air-fuel ratio.

Figure 18:
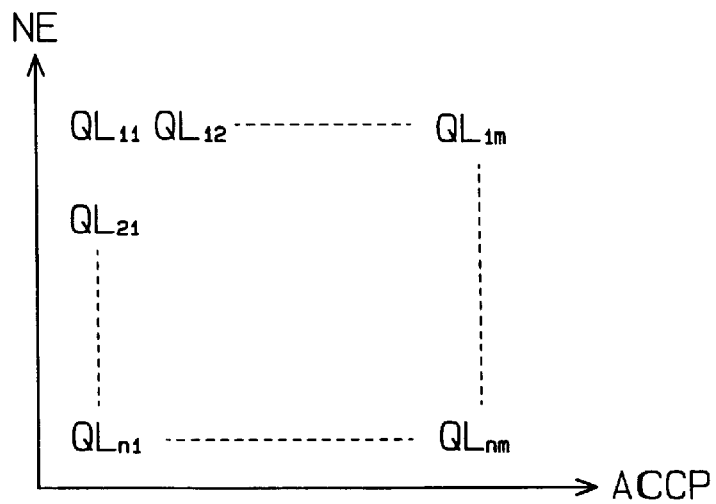
FIG. 18 is a map used for calculating a lean combustion fuel injection amount QL of the engine shown in FIG. 1.

The lean combustion fuel injection amount QL is computed based on the engine speed NE and the depression degree ACCP of the acceleration pedal 64a. The lean injection amount QL is used when the engine 2 is running in the area R1 and represents an optimized fuel injection amount. In other words, the injection amount QL represents an optimized injection amount for matching the actual output torque with a required torque during stratified charge combustion, which will be described below. The lean injection amount QL increases as the pedal depression degree ACCP increases. As shown in FIG. 18, the lean injection amount QL is determined based on the engine speed NE and the pedal depression degree ACCP by referring to a map, which is based on experiments.

In the area R1, stratified combustion is executed. That is, fuel is injected once at the end of the compression stroke. The computed lean injection amount QL is used as the injection amount Q. The injected fuel hits the wall 10b of the bowl 10a. The fuel is then concentrated near the plug 17, which stratifies air-fuel mixture in the combustion chamber 16. At this time, the combustion chamber 16, except for the region in the vicinity of the plug 17, is filled with air. The mixture is ignited by the spark plug 17.

When the running state is in the area R2, homogeneous charge combustion is executed. That is, fuel is injected once during the intake stroke. This forms a homogenous mixture, the air-fuel ratio of which is stoichiometric, in the entire combustion chamber 16. In some cases, the air-fuel ratio is richer than the stoichiometric ratio. The lean injection amount QL is not used as the injection amount Q. Instead, the fuel injection amount Q is computed based on a basic injection amount QBS and a feedback correction factor FAF.

Figure 15:
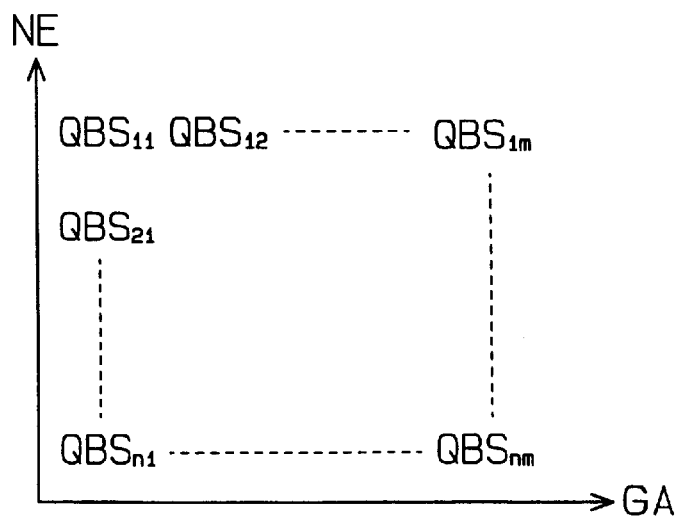
FIG. 15 is a map used for calculating a basic fuel injection amount QBS of the engine shown in FIG. 1.

The basic injection amount QBS is determined based on an intake air amount GA and the engine speed NE by referring to the map of FIG. 15, which is previously stored in the ROM 44a. The basic injection amount QBS applied to all the running areas of the engine 2.

The feedback correction factor FAF is used for matching the air-fuel ratio with the stoichiometric air-fuel ratio. The factor FAF is adjusted based on signals from the air-fuel ratio sensor 74 and is varied about the value 1.0.

In the area R2, the fuel amount Q is computed without using the lean injection amount QL. However, since it is required to monitor which one of the areas R1 and R2 the engine 2 is operating in, the computation of the lean injection amount QL is continued in both areas R1 and R2.

Next, the combustion control procedure performed by the ECU 44 will be described with reference to flowcharts of FIGS. 16 and 17. The combustion control procedure is performed at every predetermined period or at every predetermined crank angle, for example, 120° CA.

When the combustion control procedure is started, the lean injection amount QL is computed in step S100. The lean injection amount QL is determined based on the engine speed NE and the pedal depression degree ACCP by referring to the map of FIG. 18.

In step S110, the ECU 44 judges whether a stratified combustion permission flag XVVT is ON. If the permission flag XVVT is ON in step S110, the ECU 44 moves to step S120. At step S120, the ECU 44 judges which of the areas R1, R2 of FIG. 14 the engine is currently operating in based on the lean combustion amount QL and the engine speed NE.

If the permission flag XVVT is OFF at step S110 or if the lean injection amount QL is equal to or greater than the threshold value QQ and the current state is in the area R2 at step S120, the ECU 44 moves to step S130. In step S130, the ECU 44 computes a target opening size OP of the swirl control valves 54, which is suitable for homogeneous combustion. Specifically, the ECU 44 computes the opening size OP based on the intake air amount GA and the engine speed NE by referring to a map stored in the ROM 44a.

In step S140, the ECU 44 computes the basic injection amount QBS based on the intake air amount GA and the engine speed NE referring to the map of FIG. 15. In step S150, the ECU 44 computes a fuel increase value OTP, which is required when the vehicle is accelerated.

In step S160, the ECU 44 judges whether an air-fuel ratio feedback condition is satisfied. The air-fuel ratio feedback condition is satisfied, for example when (1) cranking of the engine 2 is completed, (2) a fuel cut-off operation is not being executed, (3) warming of the engine 2 is completed (for example, when the coolant water temperature THW is equal to or higher than forty degrees centigrade), (4) the air-fuel ratio sensor 74 is activated and (5) the acceleration fuel increase value OTP is zero.

If the air-fuel ratio feedback condition is satisfied in step S160, the ECU 44 moves to step S170. At step S170, the ECU 44 computes the feedback correction factor FAF and a learning value KG. The feedback correction factor FAF is computed based on signals from the air-fuel ratio sensor 74. The learning value KG shows the displacement of the factor FAF from the center value, which is 1.0. Air-fuel ratio control using values such as FAF and KG is known in the art and disclosed, for example, in Japanese Unexamined Patent Publication No. 6-10736.

If the air-fuel feedback condition is not satisfied in step S160, the ECU 44 moves to step S180 and sets the factor FAF to 1.0.

After executing either step S170 or S180, the ECU 44 moves to step S190 to compute the injection amount Q by the following equation 1.

$$Q=QBS(1+OTP+(FAF-1.0)+(KG-1.0))\alpha+\beta \qquad \text{equation 1}$$

In which the values $\alpha$ and $\beta$ are coefficients adjusted in accordance with the type of the engine 2 and the type of the currently executed control procedure.

After step 190, the ECU 44 moves to step S220. In step S200, the ECU 44 computes a target throttle opening size THROT. If the engine 2 is idling, the opening size THROT is determined such that the engine speed NE is the idling target speed. If the engine 2 is not idling, the ECU 44 computes the target opening size THROT based on the pedal depression degree ACCP and the engine speed NE by referring to a map.

In step S210, the ECU 44 sets the injection timing such that injection occurs during the intake stroke, that is, the ECU 44 executes homogeneous combustion. Thereafter, the ECU 44 temporarily suspends the combustion control.

If the lean injection amount QL is less than the threshold value QQ in step S120, that is, if the engine state is in the area R1, the ECU 44 moves to step S220. In step S220, the ECU 44 computes the target opening size OP of the swirl control valves 54 based on the lean injection amount QL and the engine speed NE by referring to a map. In step S230, the ECU 44 substitutes the lean injection amount QL, which has been computed in step S100, for the injection amount Q. In this case, the opening size OP of the swirl control valves 54 is significantly great and is almost 100%.

In step S240, the ECU 44 computes the target throttle opening size THROT based on the lean injection amount QL and the engine speed NE by referring to a map. In this case, the target throttle opening size THROT is greater than the opening size THROT in homogeneous combustion.

In step S250, the ECU 44 sets the injection timing such that injection occurs at the end of the compression stroke, that is, the ECU 44 executes stratified charge combustion. Thereafter, the ECU 44 temporarily suspends the combustion control procedure.

Figure 19:
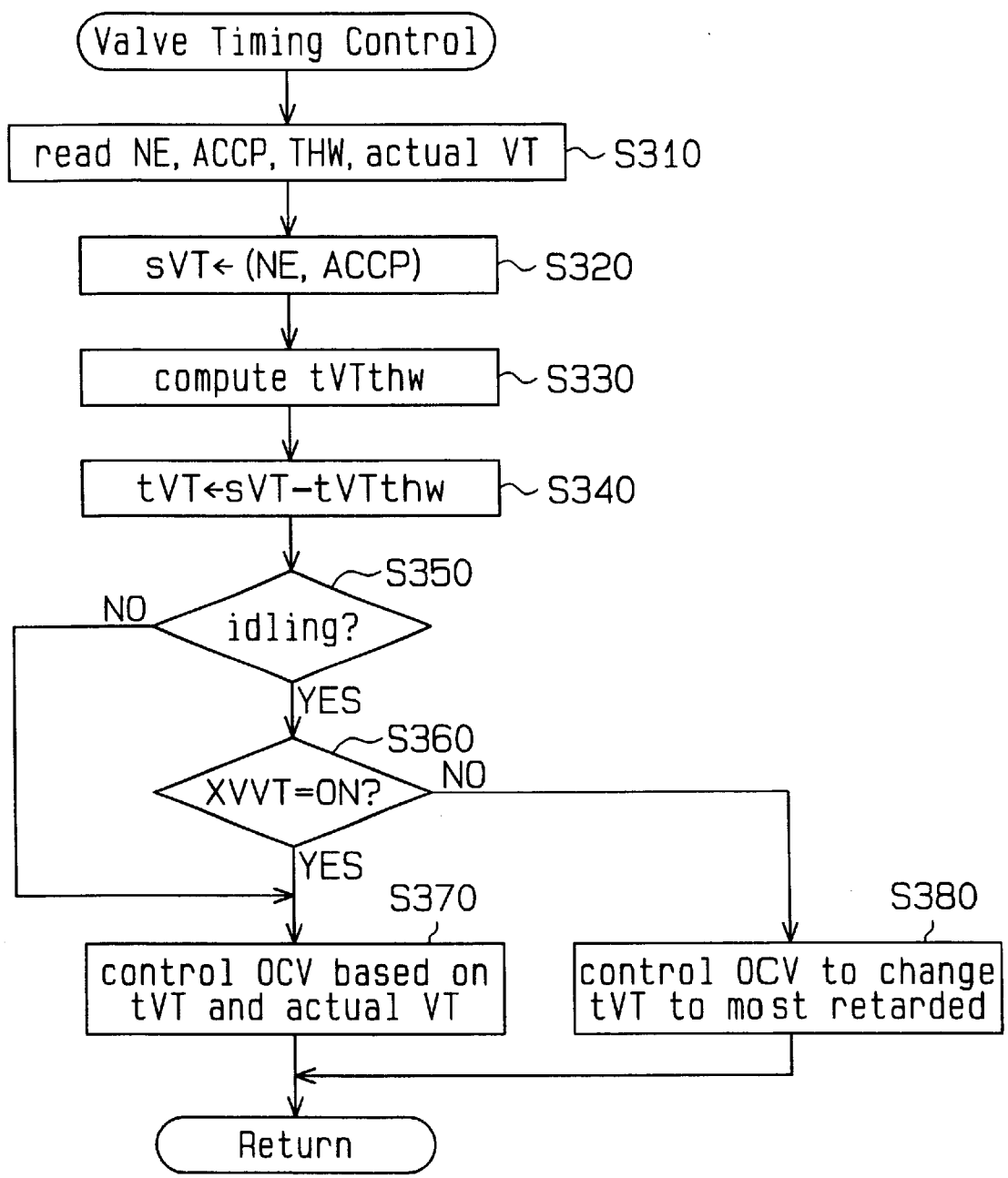
FIG. 19 is a flowchart showing a valve timing control procedure for the engine shown in FIG. 1.

A valve timing control procedure will now be described. The ECU 44 executes the valve timing control for computing a valve overlap suitable for the current running state of the engine 2. FIG. 19 shows a flowchart of the valve timing control. The valve timing control procedure is performed at every predetermined period or at every predetermined crank angle, for example, 120° CA.

When the valve timing control procedure is started, the engine speed NE, which is detected based on signals from the crank angle sensor 42, the acceleration pedal depression degree ACCP, which is detected based on signals from the pedal sensor 64, the coolant water temperature THW, which is detected based on signals from the water temperature sensor 70, and the actual valve timing (actual VT), which is detected based on signals from the cylinder distinguishing sensor 46 that are stored in a working memory, are read in step S310.

In step S320, the ECU 44 computes a basic target valve timing sVT based on the conditions of the engine 2, which, in this embodiment, are the engine speed NE and the pedal depression degree ACCP, by referring to a map stored in the ROM 44a. The basic timing sVT is used for computing an appropriate valve overlap.

In step S330, the ECU 44 computes a water temperature correction value tVTthw, which corresponds to the coolant water temperature THW, by referring to a map stored in the ROM 44a. To stabilize the combustion, the correction value tVTthw is increased as the temperature THW increases.

In step S340, the ECU 44 correct the basic target valve timing sVT based on the correction value tVTthw to compute the target valve timing tVT using the following equation 2.

$$tVT=sVT-tVTthw \qquad \text{equation 2}$$

The target valve timing tVT is decreased as the temperature THW is lowered. Accordingly, the opening timing of the intake valves 18 is delayed as the temperature THW is lowered and the valve overlap is decreased.

In step S350, the ECU 44 judges whether the engine 2 is idling. If the engine 2 is idling, the ECU 44 moves to step S360 and judges whether a stratified combustion permission flag XVVT is ON.

Figure 12:
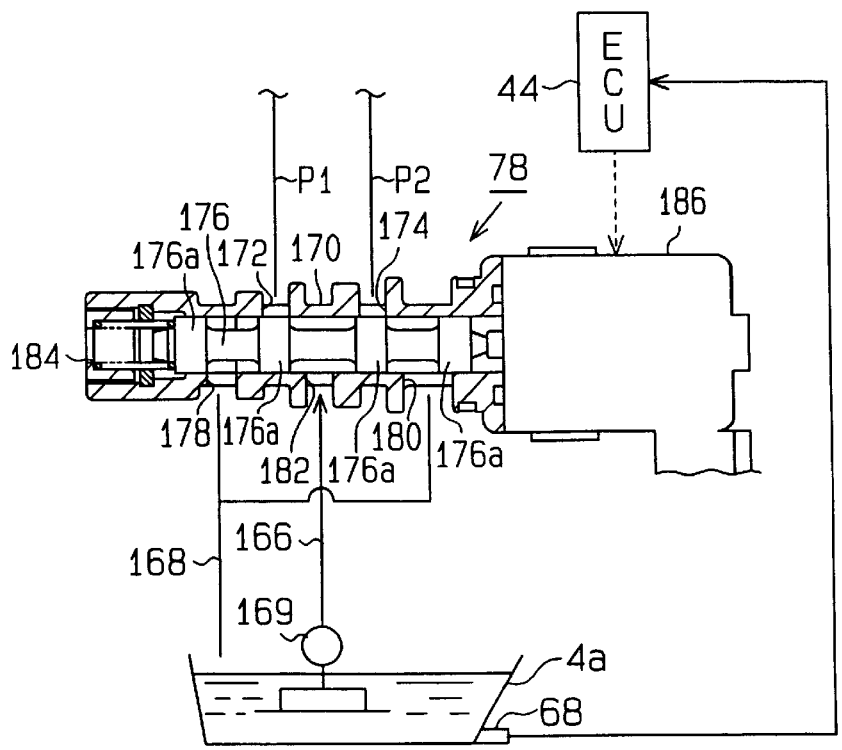
Figure 13:
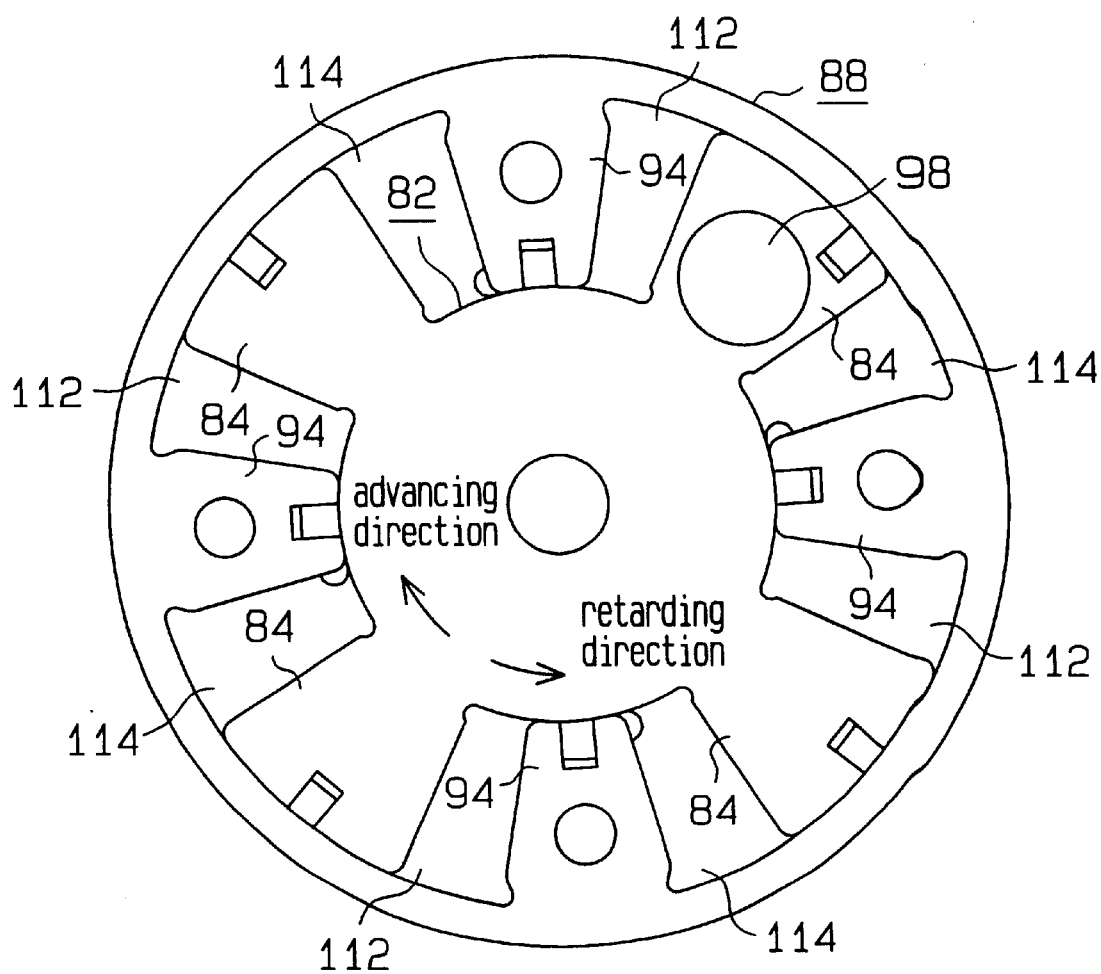
FIG. 13 is a front view illustrating an operational state of the variable valve timing mechanism shown in FIG. 7.

If the determination is NO in step S350 or if the determinations in steps S350 and S360 are both YES, the ECU 44 moves to step 370. In step S370, the ECU 44 actuates the OCV 78 to activate the VVT 80. Specifically, the ECU 44 controls the OCV 78 such that the VVT 80 operates at the target valve timing tVT based on the actual VT. The ECU 44 switches the OCV 78 among the states illustrated in FIGS. 7, 11 and 12 to adjust the valve overlap such that the inner EGR amount corresponds to the current states of the engine 2.

If the determination S350 is YES and the determination of step S360 is NO because the flag XVVT is OFF, the ECU 44 moves to step S380. In step 380, the ECU 44 controls the OCV 78 such that the VVT 80 operates at the most delayed valve timing. That is, in this embodiment, the ECU 44 controls the OCV 78 to eliminate the valve overlap and the inner EGR amount. Specifically, the ECU 44 stops the current to the solenoid 186 so that the OCV 78 is in the state of FIG. 7.

After executing either step S370 or step S380, the ECU 44 temporarily suspends the current routine. In the next control cycle, the ECU 44 repeats the above described procedure to continue optimizing the valve overlap.

In step S110 of the combustion control procedure (FIGS. 16 and 17) and in step S360 of the valve timing control (FIG. 19), the stratified combustion permission flag XVVT is used for determination. A procedure for setting the flag XVVT will now be described with reference to a flowchart of FIG. 20. The procedure of FIG. 20 is performed at every predetermined period or at every predetermined crank angle, for example, 120° CA.

Figure 20:
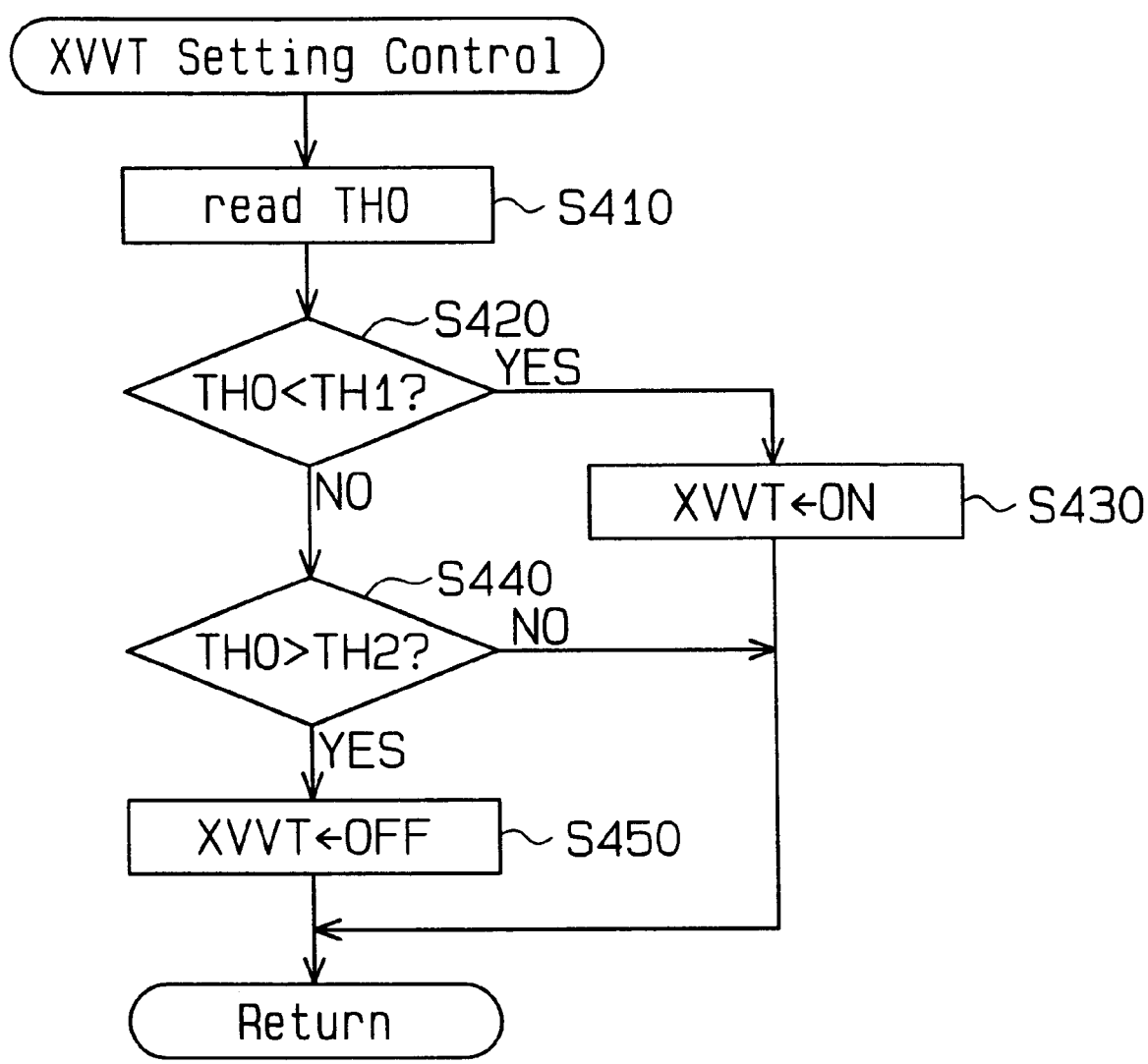
FIG. 20 is a flowchart showing a routine for setting the value of a stratified charge combustion permission flag XVVT of the engine shown FIG. 1.

When starting the procedure of FIG. 20 for setting the permission flag XVVT, the ECU 44 reads the engine oil temperature THO detected by the oil temperature sensor 68 in step S410. In step S420, the ECU 44 judges whether the oil temperature THO is lower than a first determination value TH1. If the temperature THO is lower than the determination value TH1 in step S420, the ECU 44 moves to step S430 and sets the permission flag XVVT to ON. Thereafter, the ECU 44 temporarily suspends the current routine.

If the temperature THO is equal to or higher than the determination value TH1 in step S420, the ECU 44 moves to step S440. In step S440, the ECU 44 judges whether the temperature THO is higher than a second judgment value TH2. The first and second determination values TH1 and TH2 are used for hysteresis control and the first determination value TH1 is smaller than the second determination value TH2.

If the temperature THO is equal to or lower than the second determination value TH2 in step S440, the ECU 44 temporarily suspends the current routine. If the temperature THO is higher than the second determination value TH2, the ECU 44 moves to step S450. In step S450, the ECU 44 sets the permission flag XVVT to OFF and temporarily suspends the current routine.

In this manner, if the temperature THO of the engine oil is lower than the first determination value TH1, the stratified combustion permission flag XVVT is set to ON. If the oil temperature THO is higher than the second determination value TH2, the permission flag XVVT is set to OFF. These procedures are repeatedly executed. In the combustion control and in the valve timing control, the ECU 44 judges whether a normal control procedure should be performed or a temporary control procedure should be performed. The temporary control procedure refers to a procedure where homogenous combustion is performed without any valve overlap.

When the engine oil temperature THO is relatively high, the viscosity of the oil is low, which may result in oil leakage. In this state, the oil pump 169 cannot sufficiently raise the pressure of the oil supplied to the OCV 78 and the VVT 80. The VVT 80 therefore cannot effectively operate. This is why the oil temperature THO is compared with the first and second determination values TH1, TH2 for judging whether the oil pressure is sufficient. If the oil pressure is insufficient, the stratified combustion permission flag XVVT is set to OFF, and if the oil pressure is sufficient, the flag XVVT is set to ON.

The first embodiment has the following advantages.

As described above, if the engine oil temperature THO is high, that is, higher than the second determination value TH2, the oil pressure is not high enough to actuate the VVT 80. Therefore, if stratified combustion is being performed, the VVT 80 may fail to properly control the valve overlap. In this case, the determination of step S110 is NO and the ECU 44 executes homogenous combustion in steps S130 to S210 of the combustion control.

When the state of the VVT 80 is not suitable for stratified combustion, for example, when the oil pressure is insufficient, the determination of step S110 is NO. In this case, even if the running state of the engine 2 is in the area R1, which indicates that stratified combustion should be executed, the ECU 44 executes homogeneous combustion (steps S130 to S210). During homogeneous combustion, the inner EGR does not affect the combustion state and the emission compared to stratified combustion. Therefore, even if the valve overlap cannot be controlled to correspond to the running state of the engine 2, the combustion state does not deteriorate, and the $NO_x$ in the exhaust gas does not increase.

In the valve timing control, if the state of the VVT 80 is not suitable for stratified combustion, or if the determination of step S360 is NO, the ECU 44 controls the VVT 80 to eliminate the valve overlap in step S380.

Figure 21:
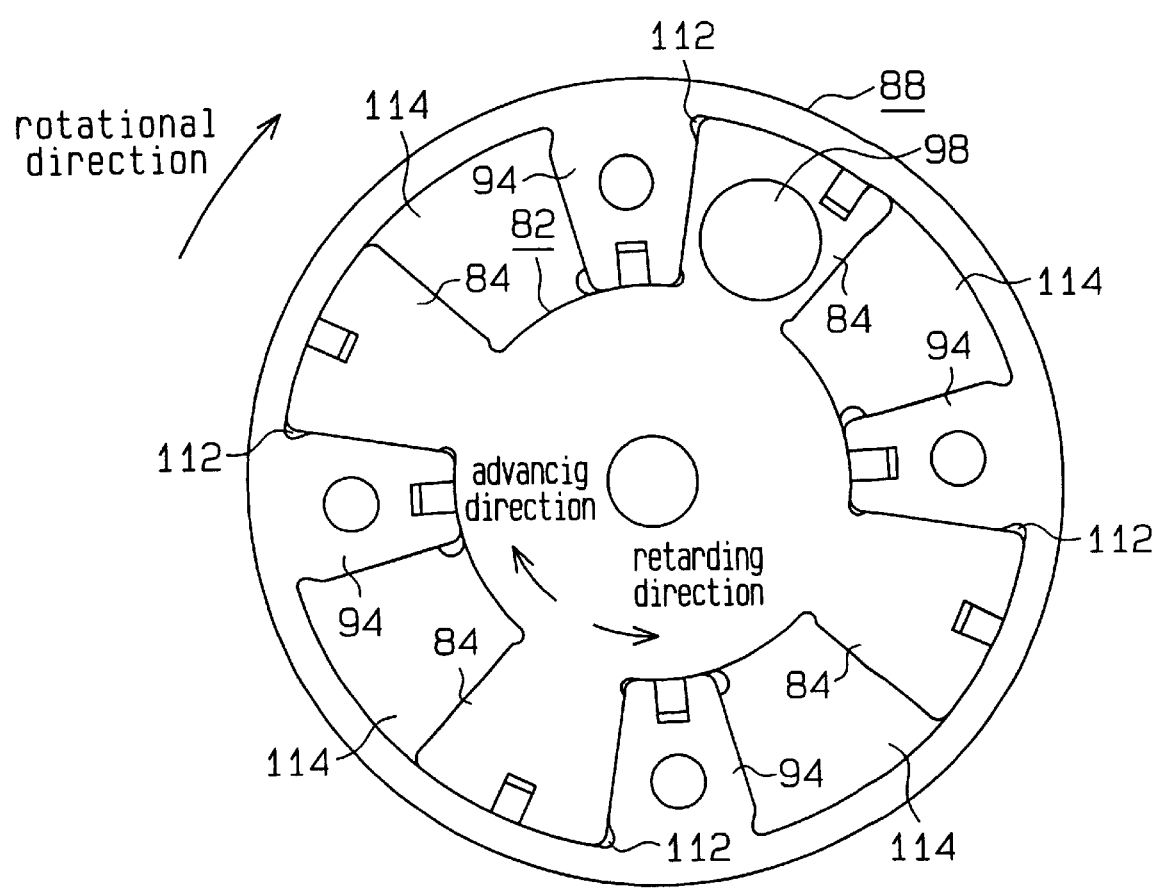
FIG. 21 is a front view illustrating an operational state of the variable valve timing mechanism shown in FIG. 7.

In this state, the oil pressure is not high enough to actuate the VVT 80. However, the ECU 44 moves the OCV 78 to the position of FIG. 7, in step S380, which permits the oil in the first hydraulic chambers 112 to drain to the oil pan 4a and permits the second hydraulic chambers 114 to receive oil from the oil pump 169. At this time, the intake camshaft 26 is receiving torque from the crankshaft 14 through the VVT 80. The reaction to the torque retards the rotational phase of the vane rotor 82, which causes the vanes 84 to reduce the first hydraulic chambers 112 and to expand the second hydraulic chambers 114. Accordingly, oil in the first chambers 112 is drained to the oil pan 4a and the second chambers 114 draw oil from the oil pan 4a. The vane rotor 82 is therefore moved to the position shown in FIG. 21, which causes the valve timing of the intake valves 18 to be most retarded and minimizes the valve overlap. In this embodiment, the valve overlap is eliminated.

In this manner, the state of the air-fuel mixture is more suitable for homogeneous combustion, which further reduces the effect of the inner EGR amount on the combustion state and the emissions.

Figure 22:
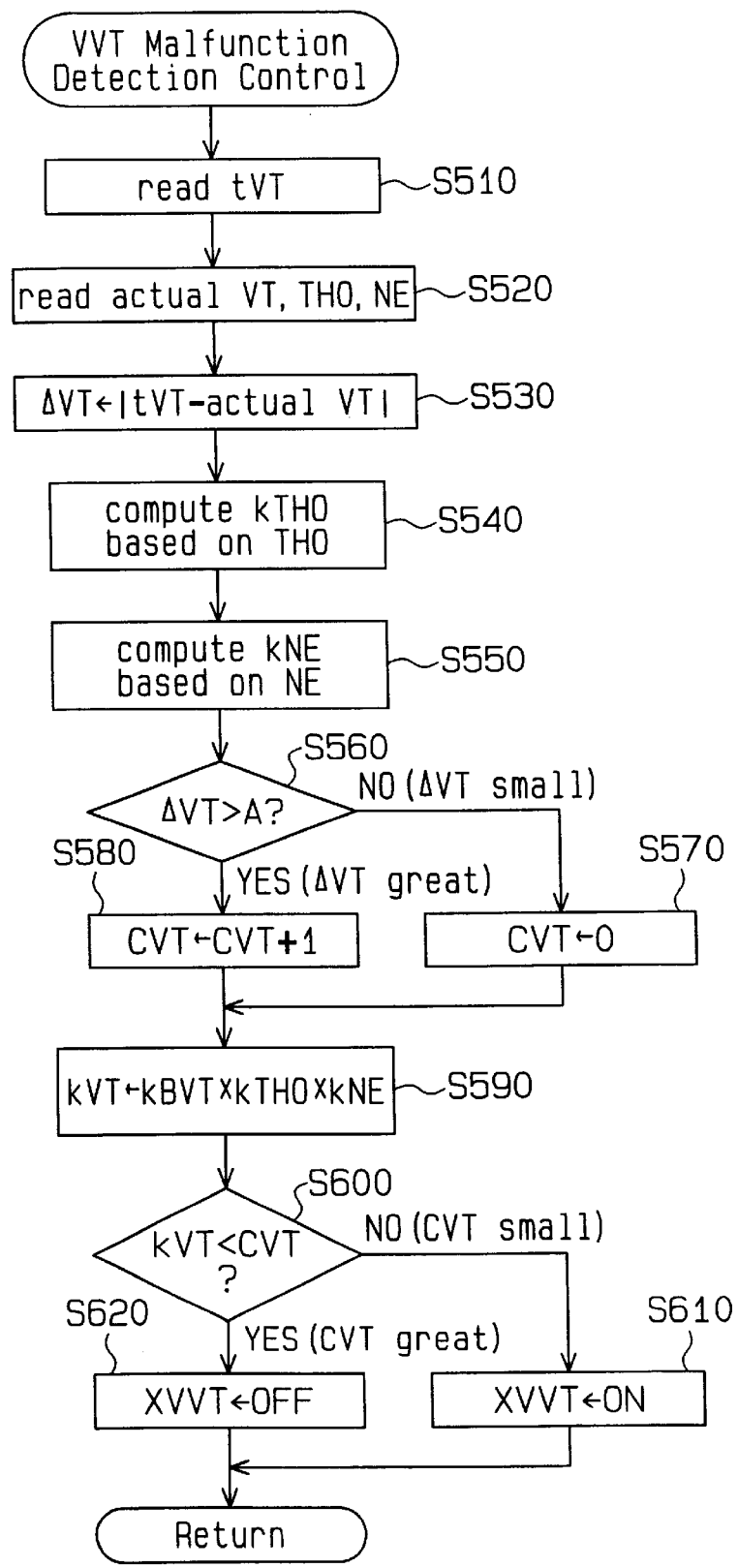
FIG. 22 is flowchart showing a routine for detecting a malfunction in a variable valve timing mechanism according to a second embodiment of the present invention.

A second embodiment will now be described. The second embodiment is the same as the first embodiment except for that a VVT malfunction detection shown in FIG. 22 is performed instead of the permission flag XVVT setting control procedure of FIG. 20. The routine of FIG. 22 is performed, for example, at the same interval as the valve timing control shown in FIG. 19.

When entering the routine of FIG. 22, the ECU 44 reads the target valve timing tVT, which was computed in the valve timing control procedure, in step S510. In step S520, the ECU 44 reads the oil temperature THO, the engine speed NE and the actual VT.

In step S530, a deviation ΔVT between the target valve timing tVT and the actual VT is computed as an absolute value by the following equation 3.

$$\Delta VT = |tVT - \text{actual } VT| \qquad \text{equation 3}$$

Figure 23A:
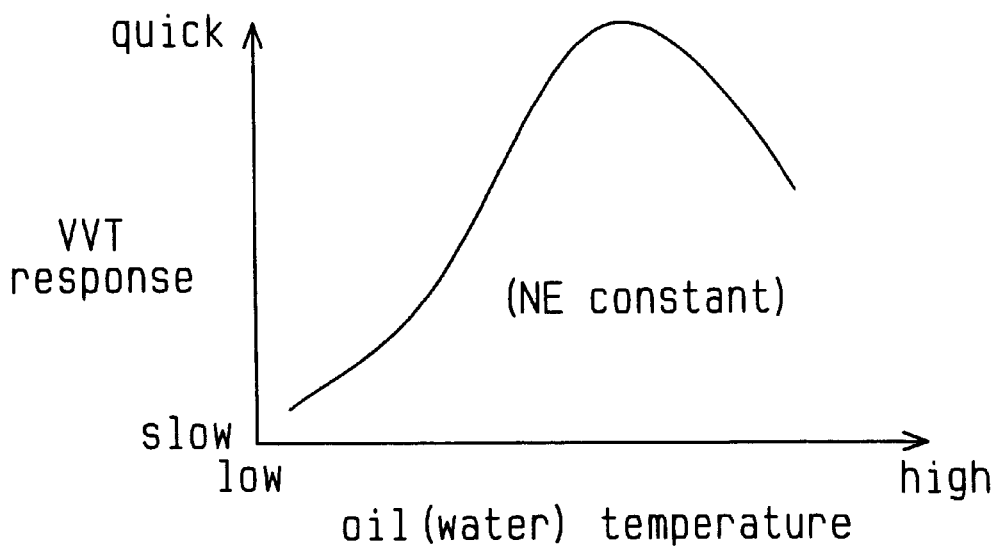
FIG. 23(*a*) is a graph showing the relationship between the oil temperature and the response of the valve timing mechanism according to the second embodiment.
Figure 23B:
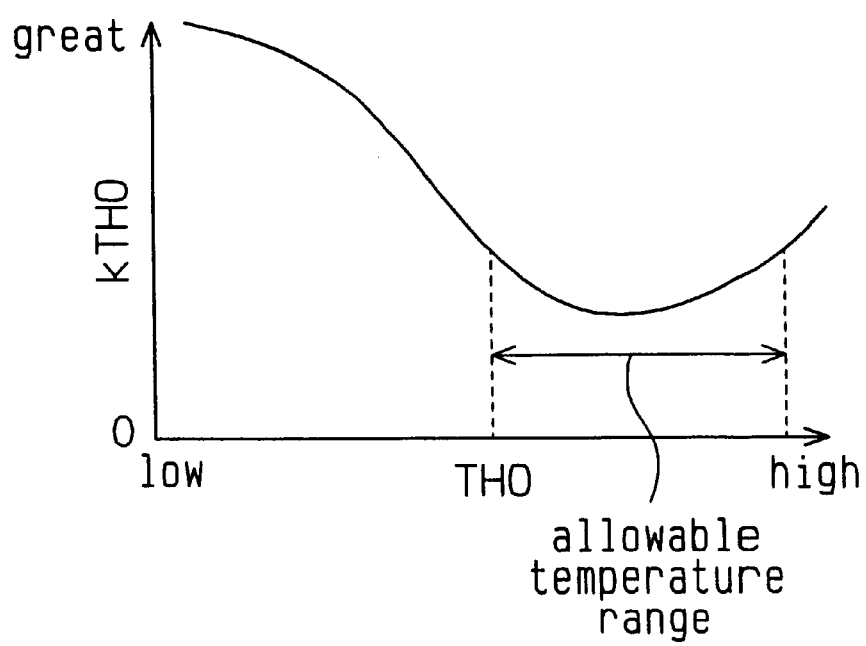

Next, the ECU 44 computes a correction value kTHO based on the oil temperature THO by referring to a map shown in FIG. 23(b) in step S540. The map of FIG. 23(b) is stored in the ROM 44a. The correction value kTHO is used for computing a malfunction detection time kVT and is determined based on the oil temperature THO, which affects the response of the VVT 80.

Figure 24A:
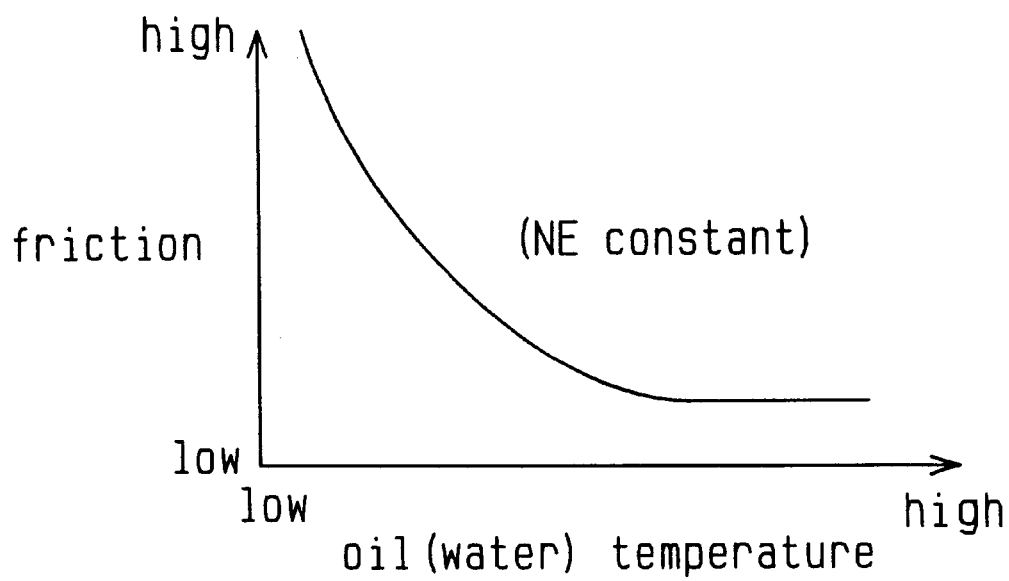
FIG. 24(*a*) is a graph showing the relationship between the oil temperature and friction according to the second embodiment.
Figure 24B:
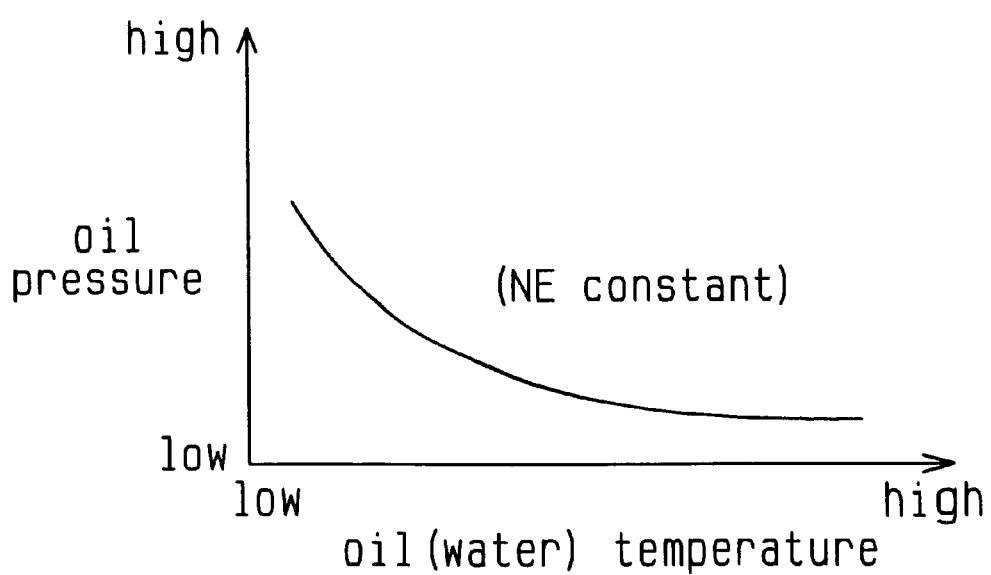

The response of the VVT 80, which is hydraulically actuated, is affected by friction in the VVT 80 and the pressure of the oil from the pump 169. The friction in the VVT 80 increases as the oil temperature THO is lowered, as shown in FIG. 24(a). The oil pressure is lowered as the oil temperature THO is increased as shown in FIG. 24(b). Therefore, by the influence of the friction and the oil pressure, the relationship between the response of the VVT 80 and the oil temperature THO changes as shown in FIG. 23(a). The graph of FIG. 23(a) represents a case where the engine speed NE is constant. Taking the response of the VVT 80 to the oil temperature THO, the relationship between the oil temperature THO and the correction value kTHO is defined as shown in FIG. 23(b). A range in which the response of the VVT 80 is acceptable is defined as an allowable temperature range.

Figure 25A:
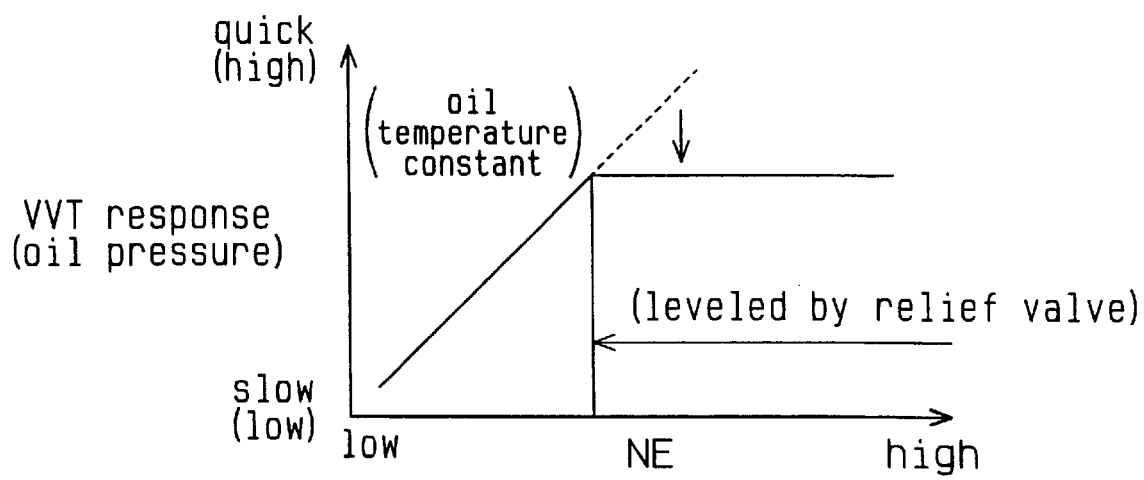
FIG. 25(*a*) is a graph showing the relationship between the engine speed NE and the response of the variable valve timing mechanism.
Figure 25B:
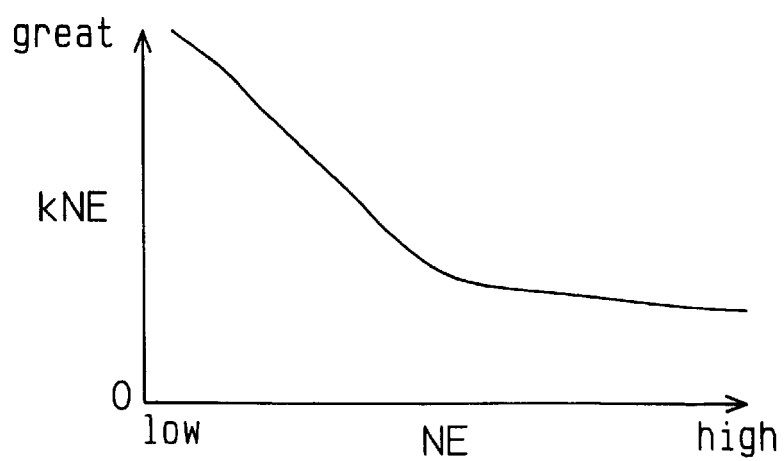

In step S550, the ECU 44 computes a rotation speed correction value kNE based on the engine speed NE by referring to the map of FIG. 25(b), which is stored in the ROM 44a. Like the correction value kTHO, the correction value kNE is used when computing the malfunction detection time kVT. The correction value kNE is determined based on the engine speed, which affects the response of the VVT 80.

The engine speed NE affects the pressure of oil supplied by the oil pump 169, which is actuated by the engine 2. As shown in FIG. 25(a), the oil pressure increases as the engine speed NE increases. The oil temperature is assumed to be constant in the graph of FIG. 25(a). Since the oil temperature is prevented from increasing above a predetermined value by a relief valve (not shown), the oil pressure is constant when the engine speed NE is higher than a predetermined value. The oil pressure is substantially proportional to the response of the VVT 80. The graph of FIG. 25(a) thus can be regarded as a graph representing the relationship between the engine speed NE and the response of the VVT 80. In view of the relationship between the engine speed NE and the response of the VVT 80, the relationship between the engine speed NE and the correction value kNE is defined as a graph shown in FIG. 25(b).

In step S560, the ECU 44 judges whether the valve timing deviation $\Delta VT$, which is computed in step S530, is greater than a determination value A (A>0).

If the deviation $\Delta VT$ is equal to or less than the value A in S560, a timer counter CVT is set to zero in step S570. If the deviation $\Delta VT$ is greater than the value A in step S560, the timer counter CVT is incremented by one in step S580.

After executing either step S570 or step S580, the ECU 44 computes the malfunction detection time kVT by the following equation 4 in step S590.

$$KVT = KBVT \times KTHO \times kNE \qquad \text{equation 4}$$

The basic time KBVT is previously determined. The malfunction detection time kVT is computed by multiplying the basic time kBVT by the correction values kTHO and kNE, which are computed in steps S540 and S550.

The ECU 44 judges whether the timer counter CVT is greater than the malfunction detection time kVT in step S600.

If the malfunction detection time kVT is equal to or greater than the timer counter CVT in step S600, the deviation $\Delta VT$ has been greater than the value A for a period that is shorter than the malfunction detection time kVT or the deviation $\Delta VT$ is equal to or less than the value A. The ECU 44 therefore judges that the response of the VVT 80 is normal and sets the stratified combustion permission flag XVVT to ON in step S610.

If the detection time kVT is less than the timer counter CVT in step S600, the deviation $\Delta VT$ has been greater than the value A for a period that is longer than the detection time kVT. Thus, the ECU 44 judges that the response of the VVT 80 is abnormal and sets the permission flag XVVT to OFF in step S620.

The ECU 44 temporarily suspends the current routine and repeats the procedure of FIG. 22 in the subsequent routine.

As described above, the stratified combustion permission flag XVVT is set to ON if the VVT 80 is functioning normally and is set to OFF if the VVT 80 is not functioning normally.

The second embodiment has the following advantage.

Whether the VVT 80 is functioning normally is judged. If the VVT 80 is not functioning normally, the combustion is switched to homogeneous combustion and the valve timing of the intake valves 18 is most retarded, which eliminates the valve overlap. Thus, even if the VVT 80 is not functioning normally, the inner EGR amount does not affect the combustion state and the emissions. Also, the combustion state does not deteriorate and the $NO_x$ in the exhaust gas does not increase.

Figure 26:
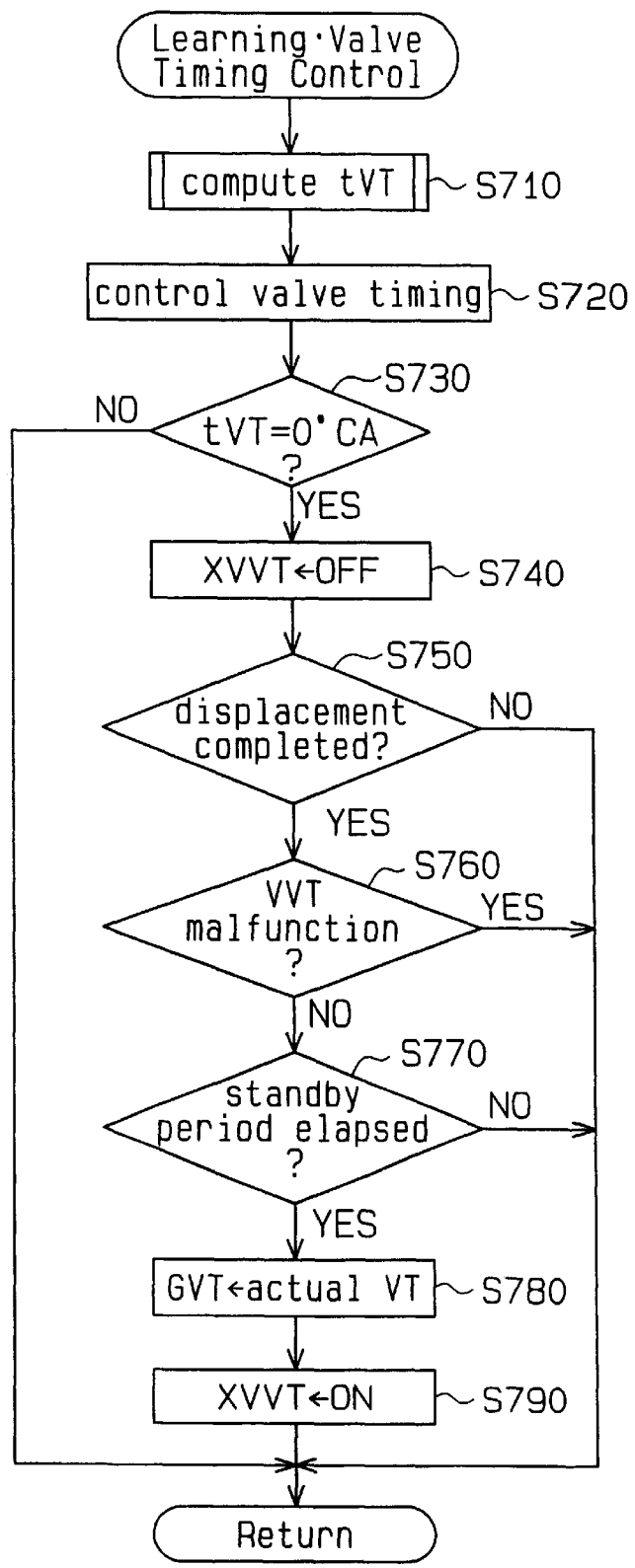
FIG. 26 is a flowchart showing a routine for learning the most retarded position and for controlling the valve timing according to a third embodiment.

A third embodiment will now be described. The third embodiment is the same as the first embodiment except for that the control procedure of FIG. 26 is performed instead of the valve timing control procedure of FIG. 19. The control procedure of FIG. 26 is performed for learning the most retarded valve timing and for controlling the valve timing. Also, in the third embodiment, the permission flag XVVT setting control procedure of FIG. 20 is not performed. The routine of FIG. 26 is performed, for example, at the same interval as the valve timing control procedure shown in FIG. 19. The most retarded valve timing learning control procedure is performed to determine the most retarded angle position, which is the referential position of the VVT 80. The initial value of a most retarded angle learning value GVT is the upper limit value in the tolerance of the valve timing. The initial value of the value GVT is used, for example, when the battery is changed. The initial value of the stratified combustion permission flag XVVT is set to OFF.

When starting the routine of FIG. 26, the ECU 44 computes the target valve timing tVT in step S710. To compute the target valve timing tVT, the ECU 44 executes steps that are the same as steps S310 to S340 of the routine of FIG. 19. Thereafter, the ECU 44 controls the OCV 78 such that the engine 2 operates at the computed target valve timing tVT in step S720. In other words, the ECU 44 controls the OCV 78 to match the actual VT with the target valve timing tVT.

In the control of the actual VT, a value computed based on signals from the crank angle sensor 42 and the distinguishing sensor 46 are not used. Instead, the actual VT is corrected by the learning value GVT as shown in the equation 5.

$$\text{actual VT} = \text{actual VT} - GVT \qquad \text{equation 5}$$

The ECU 44 controls the OCV 78 such that the corrected actual VT matches the target valve timing tVT.

If the target valve timing tVT is 0° CA, the ECU 44 maintains the OCV 78 in the state of FIG. 7. Accordingly, the vanes 84 of the vane rotor 82 contact the projections 94 of the housing body 88. The valve timing is therefore most stable, or most retarded.

In step S730, the ECU 44 judges whether the target valve timing tVT is 0° CA. If the timing tVT is not 0° CA, the ECU 44 does not perform the procedure for learning the referential position and temporarily suspends the current routine. In other words, the regular control procedure of the VVT 80, which is in accordance with the running state of the engine 2, is performed.

If the timing tVT is 0° CA in step S730, the ECU 44 sets the stratified combustion permission flag XVVT to OFF in step S740 to perform the referential position learning control procedure. Accordingly, the determination in step S110 of the combustion control procedure shown in FIG. 16 continues to be NO and steps S130 to S210 continue to be executed until the flag XVVT is switched to ON. Thus, homogeneous charge combustion is executed.

After step S740, the ECU 44 judges whether a displacement of the intake camshaft 26 by the VVT 80 is completed in step S750. If the actual VT is currently changing, the ECU 44 judges that the displacement is not completed in step S750. In this case, the ECU 44 waits for the displacement to be completed.

If the actual VT stops changing in step S750, the ECU 44 judges whether the VVT 80 is malfunctioning in step S760. If the actual VT stops changing when the actual VT is significantly different from the target valve timing tVVT, the ECU 44 judges that the VVT 80 is malfunctioning and temporarily suspends the routine.

If the VVT 80 is not malfunctioning, the ECU 44 waits for a predetermined standby period to pass in step S770 to stabilize the actual VT.

When the standby period has elapsed, the ECU 44 substitutes the actual VT for the learning value GVT in step S780. In step S790, the ECU 44 sets the flag XVVT to ON and temporarily suspends the current routine.

Figure 16:
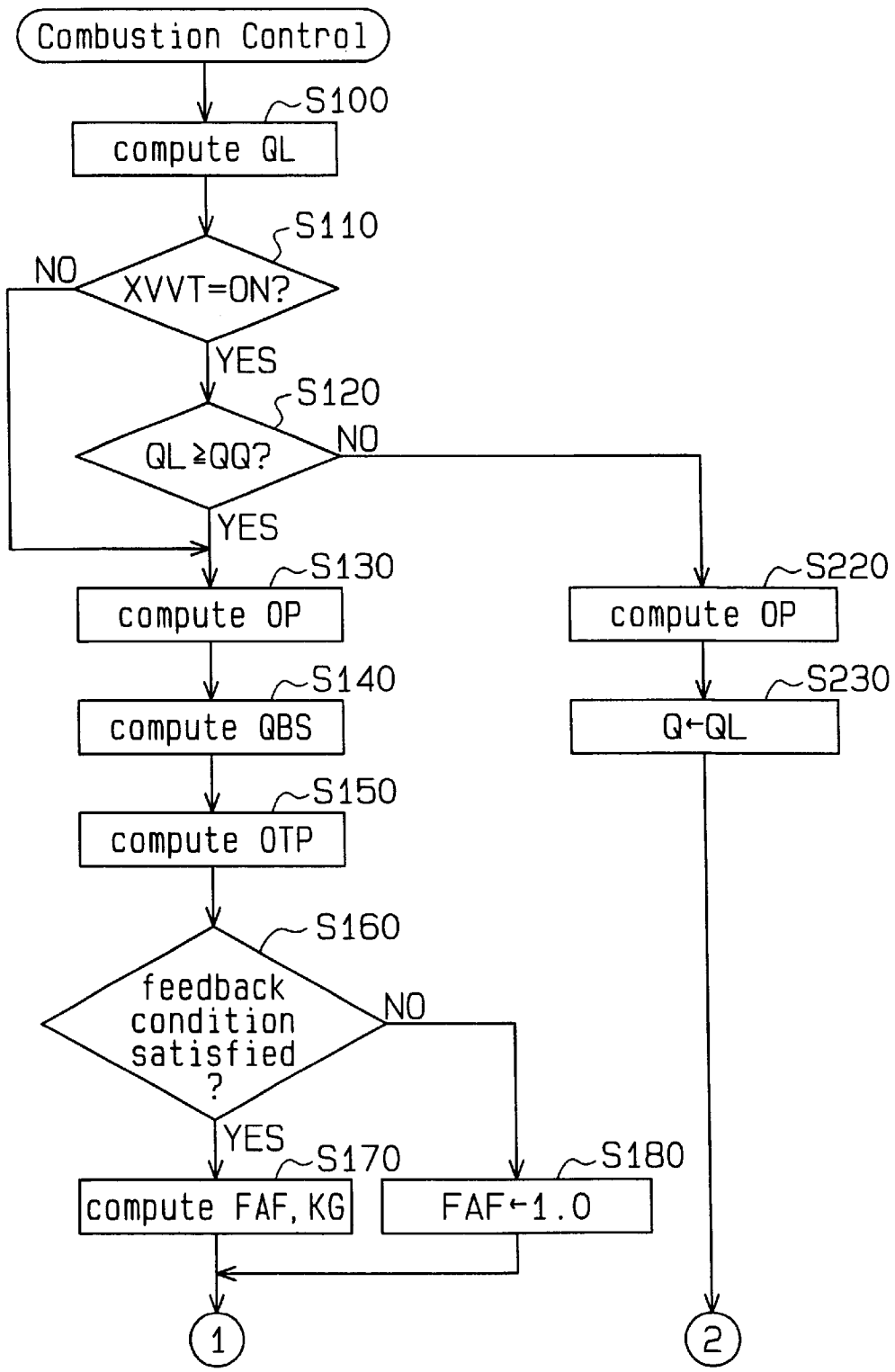
FIGS. 16 and 17 are flowcharts showing a combustion control procedure for the engine shown in FIG. 1.
Figure 17:
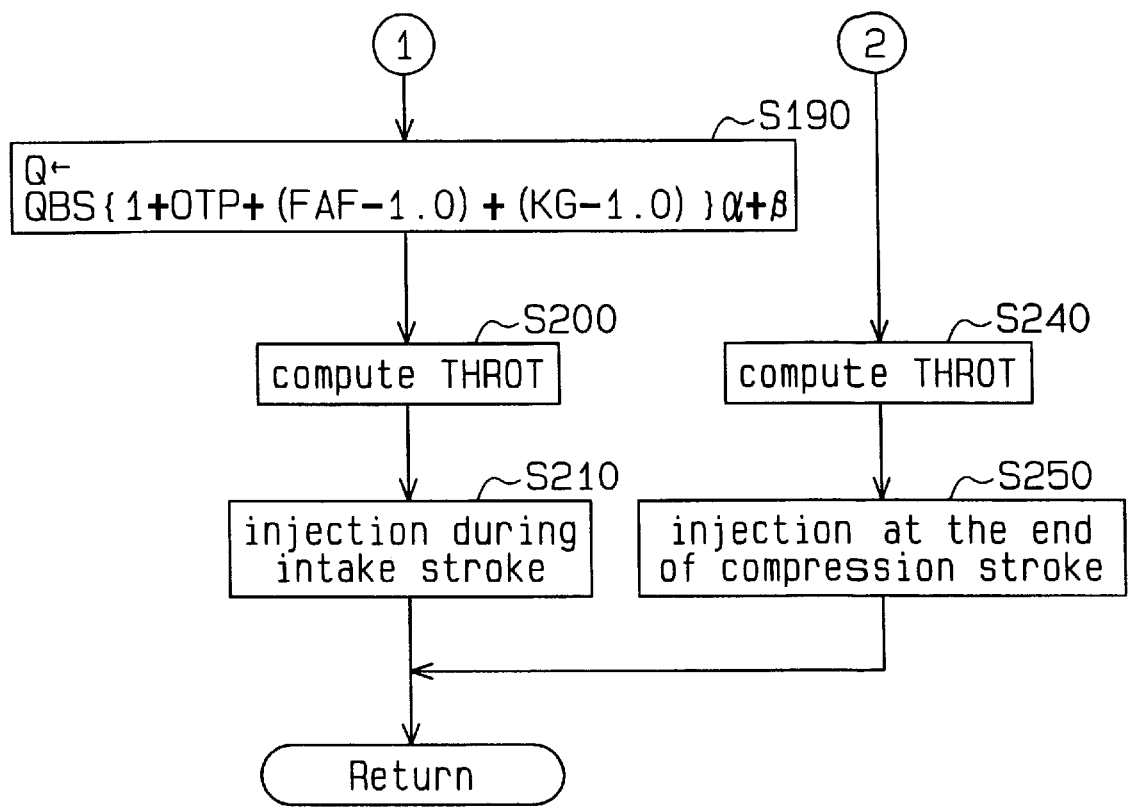

Accordingly, the determination of step S110 of the combustion control procedure shown in FIG. 16 is YES, and homogeneous combustion is finished.

During the learning of the value GVT, the stratified combustion permission flag XVVT is set to OFF and homogeneous combustion is executed.

The third embodiment has the following advantage.

The referential position of the VVT 80 is determined in the procedure for learning the most retarded angle. In this procedure, the valve overlap is maintained at zero regardless of the running state of the engine 2 in the period from step S750 to step S780. In this period, the valve overlap cannot be controlled in accordance with stratified combustion. Therefore, homogenous combustion is performed during this period. This reduces the influence of the inner EGR amount on the combustion state and the emissions. Also, the combustion state does not deteriorate and the $NO_x$ in the exhaust gas does not increases.

It should be apparent to those skilled in the art that the present invention may be embodied in many other specific forms without departing from the spirit or scope of the invention. Particularly, it should be understood that the invention may be embodied in the following forms.

In the first embodiment, the oil pressure is computed based on the oil temperature THO. However, the oil pressure may be directly detected by an oil pressure sensor.

In the first embodiment, the operation of the VVT 80 is judged to be insufficient only when the oil temperature THO is high. However, if the oil temperature THO is extremely low, the oil viscosity is high and the oil pump cannot send enough oil to the VVT 80. Therefore, the ECU 44 may judge that the operation of the VVT 80 is insufficient. In this case, the ECU 44 may perform homogenous combustion and cause the valve timing of the intake valves 18 to be most retarded.

In the second embodiment, the control for setting the stratified combustion permission flag XVVT of FIG. 20 may be executed. In this case, if the permission flag XVVT is set to OFF in either of the VVT malfunction detection routine of FIG. 22 (S620) or the flag setting routine of FIGS. 20 (S450), homogeneous combustion is performed and the valve timing i s most retarded.

In the third embodiment, the flag setting routine of FIG. 20 may be executed. In this case, if the flag XVVT is set to OFF either in the routing of FIG. 26 (S740) or in the flag XVVT setting routine of FIG. 20 (S450), the homogeneous combustion is performed.

In the illustrated embodiments, the valve overlap is adjusted by controlling the valve timing of the intake valves 18. However, the valve overlap may be adjusted by controlling the valve timing of the exhaust valves 20.

In the illustrated embodiments, the vane rotor 82 of the VVT 80 is rotated by the difference between the oil pressure in the first hydraulic chambers 112 and the oil pressure in the second hydraulic chambers 114, which adjusts the valve timing. However, a helical type VVT may be used. A helical type VVT has a piston, which is hydraulically moved and changes the valve timing by a helical mechanism.

In the illustrated embodiments, the oil temperature THO is used as a variable in several procedures. However, the coolant water temperature THW may replace the oil temperature THO.

In the first and second embodiments, if the VVT 80 is not operating effectively, the OCV 78 is set to the state of FIG. 7 (S380) to move the intake camshaft 26 to the most retarded position by the rotation resistance of the intake camshaft 26. Alternatively, a compression spring may be located in each second hydraulic chamber 114. In this case, if the OCV 78 is in the state of FIG. 7 and the oil pressure is not sufficient, the force of the springs moves the intake camshaft 26 to the most retarded position. When the VVT 80 is replaced by a helical mechanism, a spring may be provided to move a camshaft to the most retarded position when the oil pressure is not sufficient.

Therefore, the present examples and embodiments are to be considered as illustrative and not restrictive and the invention is not to be limited to the details given herein, but may be modified within the scope and equivalence of the appended claims.

What is claimed is:

1. An apparatus for controlling an engine, wherein the engine has a variable valve timing mechanism to adjust the valve overlap of an intake valve and an exhaust valve in accordance with the running state of the engine, and wherein the engine operates in a combustion mode selected from a plurality of combustion modes in accordance with the running state of the engine, the combustion modes including a stratified charge combustion mode, in which a mixture of air and fuel is non-uniformly injected into a combustion chamber, and a homogeneous charge combustion mode, in which the mixture is distributed in a homogeneous manner in the combustion chamber, the apparatus comprising:

means for determining whether the state of the variable valve timing mechanism is suitable for stratified charge combustion; and a controller, wherein, when the state of the variable valve timing mechanism is judged to be not suitable for stratified charge combustion, the controller forces the engine to perform homogeneous charge combustion regardless of the running state of the engine.

2. The apparatus according to claim 1, wherein, when the variable valve timing mechanism is malfunctioning, the determining means judges that the state of the variable valve timing mechanism is not suitable for stratified charge combustion.

3. The apparatus according to claim 1, wherein, when the running state of the engine is not suitable for a normal operation of the variable valve mechanism, the determining means judges that the state of the variable valve timing mechanism is not suitable for stratified charge combustion.

4. The apparatus according to claim 3, wherein the variable valve timing mechanism is actuated by hydraulic pressure generated by the operation of the engine, and wherein, when the hydraulic pressure is lower than a predetermined reference value, the determining means judges that the running state of the engine is not suitable for a normal operation of the variable valve mechanism.

5. The apparatus according to claim 1, wherein the variable valve timing mechanism is controlled to create a valve overlap that is based on the running state of the engine when a regular control procedure is in effect, and the determining means judges that the state of the variable valve timing mechanism is not suitable for stratified charge combustion when the regular control procedure is not in effect.

6. The apparatus according to claim 5 further comprising means for executing a procedure for determining a reference position of the variable valve timing mechanism, wherein the determining means judges that the state of the variable valve timing mechanism is not suitable for stratified charge combustion when the procedure for determining the reference position is being executed.

7. The apparatus according to claim 1 further comprising means for controlling the variable valve timing mechanism to minimize the valve overlap when the state of the variable valve timing mechanism is judged to be not suitable for stratified charge combustion.

8. An apparatus for controlling an engine that produces power by burning a mixture of air and fuel in a combustion chamber, wherein the engine operates in a combustion mode selected from a plurality of combustion modes in accordance with the running state of the engine, the combustion modes including the stratified charge combustion mode, in which the mixture is non-uniformly injected into the combustion chamber, and a homogeneous charge combustion mode, in which the mixture is distributed in a homogeneous manner in the combustion chamber, the apparatus comprising:

fuel injector for directly injecting fuel into the combustion chamber;

an intake valve, wherein the intake valve selectively opens and closes the combustion chamber to permit air to flow into the combustion chamber;

an exhaust valve, wherein the exhaust valve selectively opens and closes the combustion chamber to permit burned gas to flow out of the combustion chamber;

a variable valve timing mechanism to adjust the valve overlap of the intake valve and the exhaust valve in accordance with the running state of the engine; and a controller for determining whether the state of the variable valve timing mechanism is suitable for stratified charge combustion, wherein, when the state of the variable valve timing mechanism is not suitable for stratified charge combustion, the controller sets the combustion mode to homogeneous charge combustion.

9. A method for controlling an engine, the method comprising:

adjusting the valve overlap of an intake valve and an exhaust valve with a variable valve timing mechanism in accordance with the running state of the engine;

selecting a combustion mode from various combustion modes in accordance with the running state of the engine, the combustion modes including a stratified charge combustion mode, in which a mixture of air and fuel is non-uniformly injected into a combustion chamber, and a homogeneous charge combustion mode, in which the mixture is distributed in a homogeneous manner in the combustion chamber; and determining whether the state of the variable valve timing mechanism is suitable for stratified charge combustion, wherein homogeneous charge combustion mode is selected regardless of the running state of the engine when the state of the variable valve timing mechanism is judged to be not suitable for stratified charge combustion.

10. The method according to claim 9 further comprising a step of controlling the variable valve timing mechanism to minimize the valve overlap when the state of the variable valve timing mechanism is judged to be not suitable for stratified charge combustion.

* * * * *